US008737750B2

(12) United States Patent
Strom et al.

(10) Patent No.: US 8,737,750 B2
(45) Date of Patent: May 27, 2014

(54) PIXEL BLOCK COMPRESSION AND DECOMPRESSION

(75) Inventors: Jacob Strom, Stockholm (SE); Per Wennersten, Arsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 691 days.

(21) Appl. No.: 13/024,077

(22) Filed: Feb. 9, 2011

(65) Prior Publication Data

US 2012/0200575 A1     Aug. 9, 2012

Related U.S. Application Data

(63) Continuation of application No. PCT/SE2011/050123, filed on Feb. 4, 2011.

(51) Int. Cl.
*G06K 9/36*     (2006.01)
(52) U.S. Cl.
USPC .......................................... 382/232
(58) Field of Classification Search
USPC .......................................... 382/232, 233, 238
See application file for complete search history.

(56) References Cited

U.S. PATENT DOCUMENTS

| | | | |
|---|---|---|---|
| 6,266,449 B1 * | 7/2001 | Ohsawa | 382/239 |
| 6,825,847 B1 | 11/2004 | Molnar et al. | |
| 7,974,478 B2 * | 7/2011 | Bashyam et al. | 382/232 |
| 8,335,385 B2 * | 12/2012 | Strom et al. | 382/232 |
| 2008/0030384 A1 | 2/2008 | Yokose et al. | |
| 2010/0296745 A1 | 11/2010 | Strom et al. | |

FOREIGN PATENT DOCUMENTS

| | | |
|---|---|---|
| EP | 1 978 749 A2 | 10/2008 |
| EP | 2 169 959 A2 | 3/2010 |

OTHER PUBLICATIONS

International Search Report and Written Opinion of the International Searching Authority, Application No. PCT/SE2011/050123, May 26, 2011.
Kicken, "Implementing the ADRC Algorithm Within an MPEG-2 Video Decoder", Master Thesis, May 5, 1997, XP002634865, TU Eindhoven, Retrieved from the Internet: URL:http://alexcandria.tue.nl/extral/afstversl/E/497859.pdf (retrieved on Apr. 29, 2011).
Shi Yun Q. et al., "3. Differential Coding", Mar. 25, 2008, Image and Video Compression for Multimedia Engineering: Fundamentals, Algorithms and Standards, Ed. 2, CRC Press, pp. 1-21, EP002564915.

* cited by examiner

*Primary Examiner* — Samir Ahmed
(74) *Attorney, Agent, or Firm* — Myers Bigel Sibley & Sajovec, P.A.

(57) ABSTRACT

Compression of a pixel block having multiple pixels comprises calculating a respective prediction error for each pixel component of the pixels except a defined starting pixel. Respective minimum number of symbols required for representing the prediction errors are determined and used to select a symbol configuration among multiple different symbol configurations. Each such symbol configuration defines respective numbers of symbols maximally available for the different prediction errors. A compressed representation of the pixel block comprises a configuration identifier of the selected symbol configuration, a representation of the pixel value of the defined starting pixel and representations of the prediction errors calculated for the remaining pixels.

25 Claims, 20 Drawing Sheets

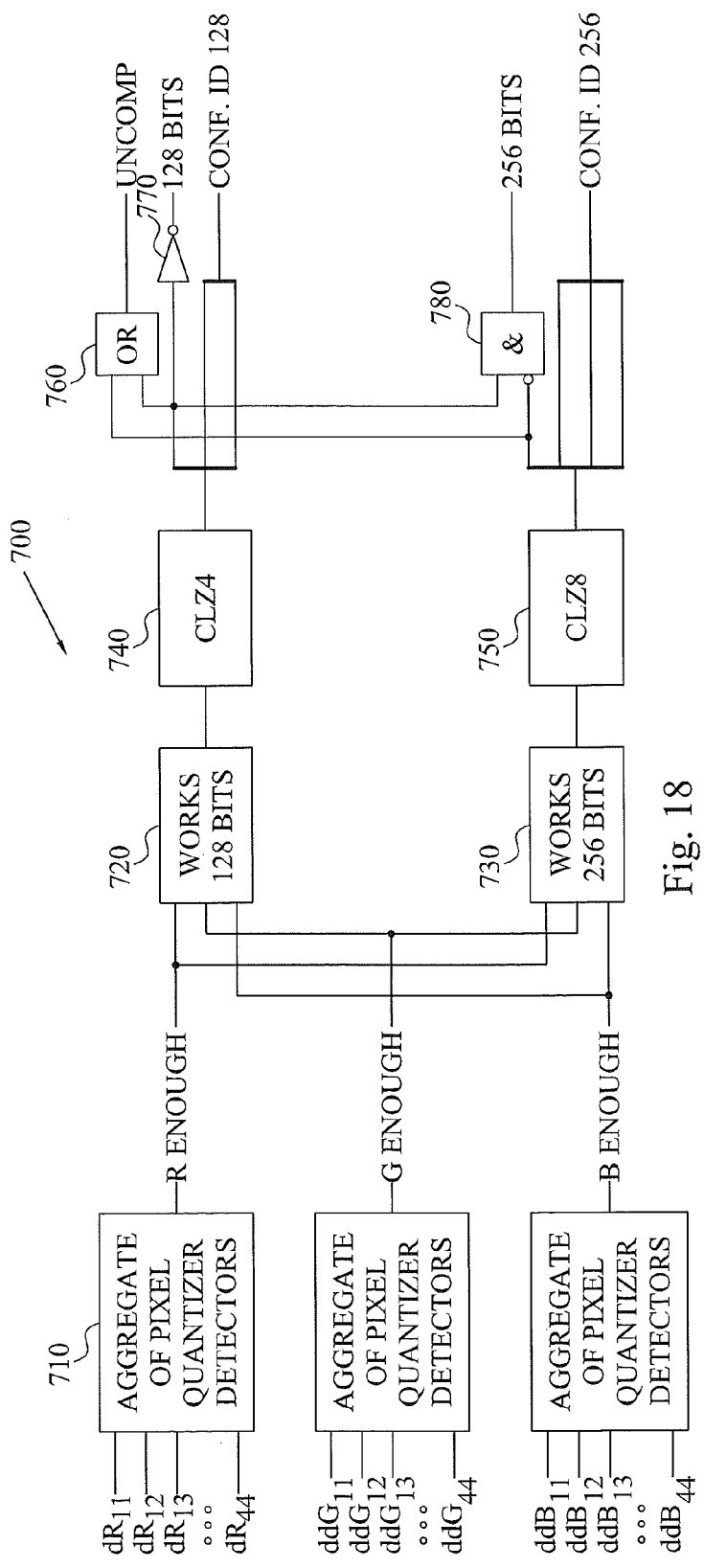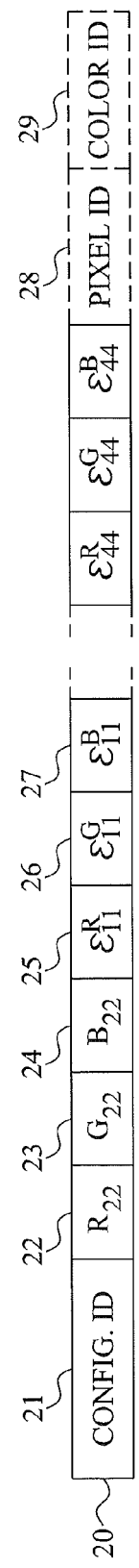

PIXEL BLOCK COMPRESSION AND DECOMPRESSION

CROSS REFERENCE TO RELATED APPLICATION

This is a 35 USC §111 application claiming priority to PCT International Application No. PCT/SE2011/050123, filed on Feb. 4, 2011, the disclosure of which is incorporated by reference herein in its entirety.

TECHNICAL FIELD

The present invention generally relates to image processing, and in particular to compressing and decompressing pixel blocks.

BACKGROUND

One of the memory-bandwidth-consuming tasks in a computer graphics system is updating buffers, and in particular the color buffer. The color buffer contains the data that is finally going to be displayed, i.e. the output pixels. In a traditional architecture the color buffer is updated triangle by triangle. First the first triangle is rasterized, and the corresponding pixels of the color buffer are updated. Then the second triangle is rasterized, writing to its pixels in the color buffer, potentially overlapping with those of the first triangle. This means that each pixel in the color buffer can be written to several times. A typical application will overwrite every pixel in the color buffer perhaps three to ten times on average. This is known as having an overdraw of 3 to 10 within the technical field. This means that the write bandwidth for the color buffer will be between three and ten times as large as if each pixel was only written once.

One way to decrease the bandwidth requirements of the color buffer is to use what is known as a tiled architecture, Instead of rasterizing the scene triangle by triangle, the color buffer is divided into non-overlapping tiles. Then the scene is rendered tile by tile. For the first tile, only the triangles overlapping with the first tile are used for rasterization. The tile size is made small enough so that the entire tile can fit on-chip on the graphical processing unit (GPU). Hence no external memory accesses to the color buffer are needed during the rendering of the triangles of the tile. When all the triangles in the tile have been rasterized, the tile is sent to the color buffer memory and the next tile is processed. Note that in a tiled architecture, each pixel in the color buffer is only written once to external memory. This means that a tiled architecture can often decrease the write bandwidth for the color buffer with a factor of 3-10. A limitation with the tiled architecture is that, although each pixel is only written once, this is still quite expensive. Furthermore, the display controller will have to read each pixel to output it to the display. This means that each pixel will have to be read from the color buffer and written to the color buffer at least once in uncompressed form, which is expensive.

Another technique to lower color buffer bandwidth is called buffer compression. This means that blocks of buffer data are stored in memory in compressed form. The scene is still processed triangle-by-triangle, but before sending a block of pixels to the color buffer memory, the pixels are compressed by variable length encoding. A few bits called size bits stored or cached in the GPU are used to keep track of how well the data was compressed, for instance compressed down to a bit length corresponding to 25%, 50% or 75% of the original bit length or not compressed at all. When a subsequent triangle wants to write to the same block of pixels, the size bits are used to know how much data should be read. The block is decompressed, the new triangle overwrites some of the pixels in the block, and the block is then again compressed and stored. Hasselgren and Akenine-Möller, 2006, Efficient Depth Buffer Compression, In Graphics Hardware, 103-110 and Rasmusson, Hasselgren and Akenine-Möller, 2007, Exact and Error-bounded Approximate Color Buffer Compression and Decompression, In Graphics Hardware, 41-48 give good overviews of color buffer compression and depth buffer compression respectively.

In practical implementations, each pixel in the color buffer might be accessed several times in each frame. In such a case, color buffer compression needs to be carried out on millions of pixel blocks each second. Prior art color buffer compression schemes are sometimes too complex to achieve this high compression speed. There is therefore a need for more efficient pixel block compression that can be applied to color buffers and other pixel value buffers

SUMMARY

It is a general objective to provide an efficient compression and decompression of pixel blocks.

This and other objectives are met by embodiments as defined herein.

An aspect of the embodiments relates to a method of compressing a pixel block comprising multiple pixels. Each of these pixels has a respective pixel value comprising at least a first pixel value component and a second pixel value component. The compression calculates a first prediction error for each pixel in the pixel block except a defined starting pixel. The first prediction error is calculated based on a first pixel value component of the pixel and a first pixel value component of a prediction pixel assigned to the pixel. A second prediction error is also calculated for each pixel except the defined starting pixel. The second prediction error is calculated based on a second pixel value component and the first pixel value component of the pixel and a second pixel value component and the first pixel value component of the prediction pixel I. First and second minimum numbers of symbols are determined for the pixel block. The first and second minimum numbers of symbols represent the number of symbols required for representing the calculated first and second prediction errors, respectively. These determined first and second minimum numbers of symbols are employed to select a symbol configuration among a set of multiple different symbol configurations. Each of these symbol configurations defines a respective first number of symbols maximally available for the first prediction errors and a respective second number of symbols maximally available for the second prediction errors. A compressed representation of the pixel block is stored in a memory and comprises a configuration identifier of the selected symbol configuration and a representation of the first and second pixel value components of the defined starting pixel. The compressed representation also comprises a first representation of the first prediction error and a second representation of the second prediction error for each pixel except the defined starting pixel. The first representations in the compressed representation of the pixel block have maximally a same number of symbols as the first number of symbols of the selected symbol configuration and the second representations have maximally a same number of symbols as the second number of symbols of the selected symbol configuration.

Another aspect of the embodiments defines a compressing device for compressing a pixel block. The compressing device comprises a first error calculator configured to calculate a respective first prediction for each pixel except the defined starting pixel based on the first pixel value component of the pixel and the first pixel value component of the prediction pixel assigned to the pixel. A second error calculator calculates a respective second prediction error for each pixel except the defined starting pixel based on the first and second pixel value component of the pixel and the first and second pixel value component of the prediction pixel. The compressing device also comprises first and second minimum determiners that determine the first and second minimum number of symbols required for representing the calculated first and second prediction errors, respectively. A configuration selector employs the determined first and second minimum number of symbols to select a symbol configuration for the pixel block among the set of multiple different symbol configurations. The compressing device thereby generates a compressed representation of the pixel block comprising the configuration identifier, the representation of the pixel value of the defined starting pixel and the first and second representations of the first and second prediction errors calculated for each pixel in the pixel block except the defined starting pixel.

A further aspect of the embodiments relates to a method of decompressing a compressed representation of a pixel block. The method comprises identifying a symbol configuration for the pixel block based on a configuration identifier included in the compressed representation. The configuration identifier enables identification, among the set of multiple different symbol configurations, of a symbol configuration defining a first number of symbols maximally available for first prediction errors and a second number of symbols maximally available for second prediction errors. The pixel value components of a defined starting pixel are determined based on a representation thereof included in the compressed representation of the pixel block. The first number of symbols defined by the identified symbol configuration is employed to locate and retrieve a respective first representation of a first prediction error from the compressed representation for each pixel except the defined starting pixel. The second number of symbols in the symbol configuration is correspondingly used to retrieve a respective second representation of a second prediction error from the compressed representation for each pixel except the defined starting pixel. The first pixel value component of a pixel is then calculated based on the retrieved first representation of the first prediction error of the pixel and a first pixel value component of a prediction pixel assigned to the pixel in the pixel block. The second pixel value component of the pixel is calculated based on the retrieved first representation of the first prediction error and the second representation of the second prediction error of the pixel and a second pixel value component of the prediction pixel.

Yet another aspect of the embodiments defines a decompressing device for decompressing a compressed representation of a pixel block. A configuration identifier of the decompressing device is configured to identify a symbol configuration with first and second number of symbols based on the configuration identifier in the compressed representation. A pixel determiner determines the pixel value of the defined starting pixel based on a representation of the pixel value included in the compressed representation. First and second error retrievers are implemented in the decompressing device to retrieve first and second representations of the first and second prediction errors, respectively, for each pixel except the defined starting pixel based on the first and second number of symbols defined by the identified symbol configuration. A first value calculator is configured to calculate a first pixel value component for each pixel except the defined starting pixel. The first pixel value component is calculated based on the first representation of the first prediction error of the pixel and the first pixel value component of the prediction pixel assigned to the pixel. A second value calculator correspondingly calculates a second pixel value component for each of the pixels except the defined starting pixel. The second pixel value component is calculated based on the first representation of the first prediction error and the second representation of the second prediction error of the pixel and the second pixel value component of the prediction pixel.

The embodiments provide compression and decompression of pixel blocks that are of low complexity and therefore achieve a fast and efficient pixel block compression and decompression. The embodiments can be used in applications where compression and decompression of a high number of pixel blocks is required during short time intervals, such as during color buffer compression and decompression.

BRIEF DESCRIPTION OF THE DRAWINGS

The invention, together with further objects and advantages thereof, may best be understood by making reference to the following description taken together with the accompanying drawings, in which:

FIG. 3 illustrates a compressed representation of a pixel block according to ah embodiment;

FIG. 13 is a schematic block diagram of a compressing device according to another embodiment;

FIG. 18 illustrates a schematic hardware implementation of the compressor part II in FIG. 15 according to an embodiment;

DETAILED DESCRIPTION

Figure 1:
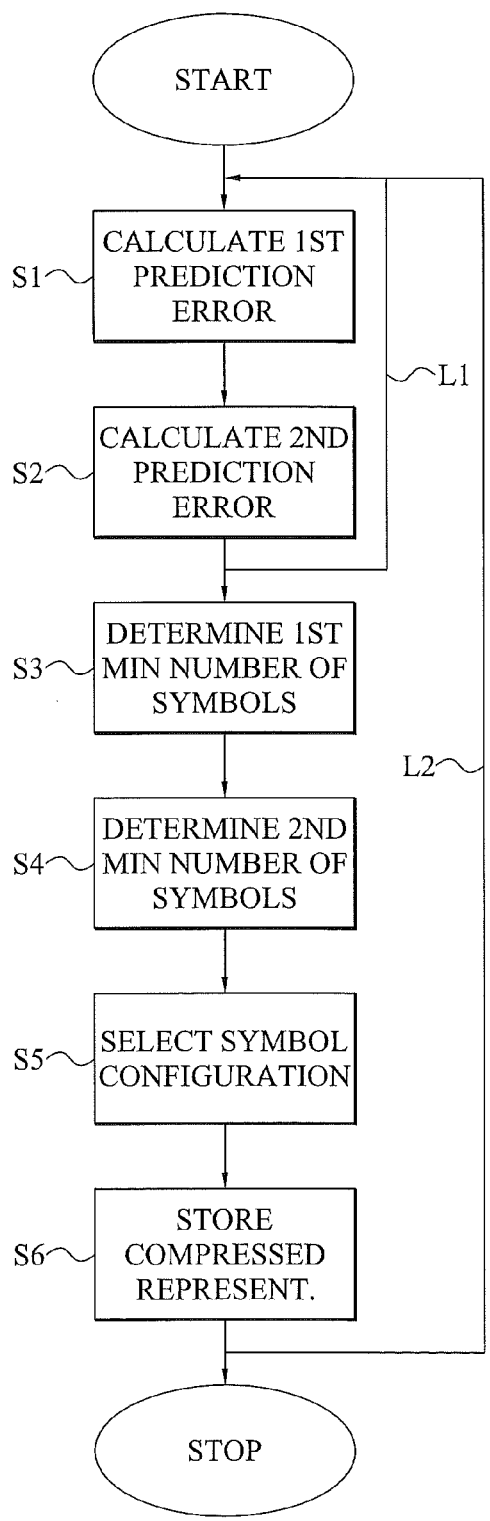
FIG. 1 is a flow diagram illustrating a method of compressing a pixel block according to an embodiment.

Throughout the drawings, the same reference numbers are used for similar or corresponding elements.

The embodiments generally relate to compression and decompression of pixel blocks and in particular to compression and decompression of pixel value buffers and pixel blocks forming part of such pixel value buffers.

According to the embodiments, each pixel in a pixel block has a respective pixel value. Various such pixel values are used in the art, depending on the particular application. A typical example of such pixel value is a color value, and more preferably a multi-component color value. In the latter case, the pixel color consists of multiple color components. A typical example of such a color is a red, green, blue (RGB) color having three color components. Other multi-component colors, such as YUV, YCoCg or YCrCb, are also known in the art and can be used according to the embodiments.

The pixel block then advantageously constitute a part of a color buffer.

Another example of a pixel value buffer, besides color, to which the embodiments can be applied, is a so-called stencil buffer. The stencil buffer can be used to limit the area of rendering, also denoted stenciling in the art. The stencil buffer can also be used in connection with a depth buffer in the rendering pipeline. For instance, stencil values can be automatically updated, i.e. increased or decreased, for every pixel that fails or passes the depth test. The stencil buffers find applications in achieving various effects, such as shadows, outline drawing or highlighting of intersections between complex primitives. In such a case, the tile could constitute at least a portion of a stencil buffer and the pixel value is a stencil value of the stencil buffer.

A further example of pixel value that can be used according to the embodiments is a normal value assigned to a pixel. The normal then comprises three components, X, Y, Z. It is generally possibly to merely use unit normals so that only two components of the normals need to be specified, whereas the third one is calculated from the other two, such as $Z=\sqrt{1-X^2-Y^2}$.

Actually, the pixel value could be any property that is desired to be assigned on pixel basis and where pixels are grouped into tiles. The usage of programmable shaders within graphics systems enables creation and usage of various pixel value buffers and the embodiments can also be applied to such pixel value buffers.

According to the embodiments, each pixel in a pixel block comprises multiple pixel value components, i.e, at least two pixel value components. A non-limiting example of two such pixel value components is the X and Y coordinates of a unit normal. Another example of multiple pixel value components is to have three pixel value components per pixel. For instance, each pixel can have three color components, such as a RGB tuple. In the following, the embodiments will be mainly described in connection with each pixel having at least a first pixel value component and a second pixel value component. However, the embodiments also encompass applications with more than two pixel value components per pixel and in particular the case with three pixel value components per pixel. In such cases, a third pixel value component or indeed any further pixel value component can basically be handled and processed in a same way as the second pixel value component as described herein. Thus, the process steps and devices disclosed herein operable on the second pixel value component could be repeated or multiplied to handle any third or further pixel value component.

Compression

FIG. 1 is a flow diagram illustrating a method of compressing a pixel block comprising multiple pixels and where each pixel has at least a first pixel value component and a second pixel value component.

Figure 2:
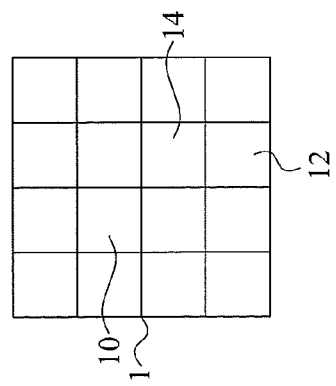
FIG. 2 is an example of a pixel block according to an embodiment.

FIG. 2 is a schematic illustration of an example of such a pixel block 1 comprising multiple pixels 10, 12, 14 of which only three have been indicated with reference numbers in the figure. In the art, pixel value buffers are divided into so-called pixel blocks 1, each comprising a number of pixels 10, 12, 14. Such a pixel block is typically rectangular or quadratic, such as a size of $M_R \times M_C$ pixels, where $M_R$, $M_C$ are positive integer numbers with the proviso that both $M_R$ and $M_C$ are not simultaneously one. Preferably, $M_R=2^{m_R}$ and $M_C=2^{m_C}$, where $m_R$, $m_C$ are positive integers. In a typical implementation $M_R=M_C$ and preferred such pixel block embodiments could be 4×4 pixels.

The method of FIG. 1 starts in step S1, where a first prediction error is calculated for a pixel in the pixel block. The first prediction error is furthermore calculated based on a first pixel value component of the pixel and a first pixel value component of a prediction pixel assigned to the current pixel. In a particular embodiment, the first prediction error is calculated as a difference between the first pixel value component of the pixel and the first pixel value component of the prediction pixel.

A corresponding second prediction error is calculated for the pixel in a next step S2 based on the first pixel value component and a second pixel value component of the pixel and the first pixel value component and a second pixel value component of the prediction pixel assigned to the pixel. In a particular embodiment, the second prediction error is calculated based on the second pixel value component of the pixel, the second pixel value component of the prediction pixel and the first prediction error calculated in step S1. Preferably, the second prediction error is calculated as the second pixel value component of the pixel subtracted by the second pixel value component of the prediction pixel and the first prediction error calculated for the pixel in step S1, which is equivalent to calculating the second prediction error as the second pixel value component of the pixel subtracted by the second pixel value component of the prediction pixel and the difference between the first pixel value component of the pixel and the first pixel value component of the prediction pixel.

The calculation of the first and second prediction errors in steps S1 and S2 are conducted for each pixel in the pixel block except a defined starting pixel. This is schematically illustrated by the line L1 in FIG. 1. If the pixel block comprises 16 pixels as illustrated in FIG. 2, steps S1 and S2 are preferably performed 15 times, i.e. once for each pixel except the defined starting pixel. Steps S1 and S2 can be performed serially as illustrated in FIG. 1. It is, though, possible to conduct the steps S1 and S2 at least partly in parallel.

The result from the loop of steps S1 and S2 is, thus, at least a first prediction error and a second prediction error for each pixel in the pixel block except the defined starting pixel. If the pixels would comprise a third pixel value component as well, a third prediction error is preferably calculated for each pixel except the defined starting pixel and in the same way as the second prediction error, i.e. based on the third pixel value component of the pixel, the third pixel value component of the prediction pixel assigned to the pixel and the first prediction error or the difference between the first pixel value components of the pixel and the prediction pixel. The third prediction error is preferably calculated as the third pixel value component of the pixel subtracted by the third pixel value component of the prediction pixel and the first prediction error.

The next steps S3 and S4 process the first prediction errors and the second prediction errors calculated in steps S1 and S2. Step S3 determines a first minimum number of symbols required for representing the first prediction errors calculated for the pixels in step S1. Step S4 correspondingly determines a second minimum number of symbols required for representing the second prediction errors calculated for the pixels in step S2. For instance, assume that the first prediction errors calculated for a pixel block of FIG. 2 would be 0, −3, 2, 2, 2, −3, 2, 2, −3, −3, 2, −3, −3, −3, 2 and assume that the symbols are bits, In such a case, 0 can be represented in zero bits, 2 using two bits and −3 using three bits. Thus, the maximum number of bits required for representing this set of first prediction errors is three bits.

The symbols of the first and second minimum number of symbols can be according to any of the traditionally employed symbol alphabets within data encoding. For instance, the alphabet of symbols could be a binary alphabet. In such a case the symbols can be $0_{bin}$, or $1_{bin}$. Other alphabets of symbols that can be used include hexadecimal symbols, i.e. $0-9_{hex}$ and $A-F_{hex}$, decimal symbols, i.e. $0-9_{dec}$. In a preferred application, a binary alphabet with a sequence of bits is used as an illustrative embodiment of symbol alphabet. A symbol as used herein does not represent a VLC symbol, i.e. a variable length coding symbol, which is sometimes employed to denote particular events, such as end of block.

If the pixels each comprise three pixel value components, the method preferably involves determining a third minimum number of symbols required for representing the third prediction errors calculated for each pixel in the pixel block except the defined starting pixel.

The two steps S3 and S4 can be conducted serially as illustrated in FIG. 1 or indeed in opposite order, i.e. determine the second minimum number of symbols prior determining the first minimum number of symbols. It is also possible to perform steps S3 and S4 at least partly in parallel.

A next step S5 selects a symbol configuration or table based on a set of multiple different symbol configurations or multiple different tables. Each such symbol configuration of the set then defines at least a respective first number of symbols maximally available for the first prediction errors and a respective second number of symbols maximally available for the second prediction errors and optionally a respective third number of symbols maximally available for the third prediction errors.

An example of such a set of symbol configurations is [3, 2, 2], [4, 2, 1], [5, 1, 1] and [4, 1, 2]. These symbol configurations have been selected for a total size of a compressed pixel block of 128 bits and when each pixel comprises a RGB color. The symbol configurations should in this example be interpreted as [dR', ddG', ddB'], where dR' represents the number of bits maximally available for the first prediction errors (red prediction errors), ddG' represents the number of bits maximally available for the second prediction errors (green prediction errors) and ddB' indicates the number of bits maximally available for the third prediction errors (blue prediction errors).

In another embodiment, adapted for a total size of a compressed pixel block of 256 bits, the set of symbol configurations could be [7, 4, 4], [6, 5, 4], [6, 4, 5], [5, 5, 5], [8, 4, 3], [8, 3, 4], [6, 6, 3] and [6, 3, 6].

The above presented sets of symbol configurations should merely be seen as illustrative but non-limiting examples of symbol configurations that can be used in connection with embodiments as disclosed herein. The embodiments are, however, not limited to these particular sets and the desired set of symbol configurations for a particular application, such as size of pixel block, type and number of pixel value components per pixel and total size of compressed pixel block, can be selected and determined in an optimization procedure testing various candidate symbol configurations.

In an embodiment, the sums of the numbers of symbols maximally available for the first, second and optional third prediction errors according to the different symbol configuration are preferably equal and constant. For instance, in the above to examples of sets of symbol configuration the sums are 7 and 15, respectively. Thus, in an embodiment $$\sum_{i=1}^{N} S_1^i + S_2^i + S_3^i = k,$$

where $S_1^i$ denotes a first number of symbols maximally available for the first prediction errors according to symbol configuration number i of the set, $S_2^i$ denotes a second number of symbols maximally available for the second prediction errors according to symbol configuration number i, $S_3^i$ denotes a third number of symbols maximally available for the third prediction errors according to symbol configuration number i, k is a constant and N denotes the number of different symbol configurations in the set.

The selection of the symbol configuration from the set in step S5 is conducted based on the first minimum number of symbols determined in step S3 and the second minimum number of symbols determined in step S4 and optionally also the third minimum number of symbols.

The selection of symbol configuration is preferably conducted by identifying one or more of the symbol configurations in the set for which the first number of symbols is equal to or larger than the first minimum number of symbols, the second number of symbols is equal to or larger than the second minimum number of symbols and optionally the third number of symbols is equal to or larger than the third minimum number of symbols. For instance, if the pixels in a pixel block each have a RGB tuple and the first minimum number of symbols calculated for the pixel block is 3 bits, the second minimum number of symbols calculated for the pixel block is 2 bits and a third minimum number of symbols calculated for the pixel block is 1 bit, any of the symbol configurations [3, 2, 2] and [4, 2, 1] could be used in this particular example. It does not matter which of these two symbol configurations that are then selected for the pixel block since they both can handle the first, second and third prediction errors calculated for the pixel block.

A next step S6 stores a compressed representation of the pixel block in a memory. This compressed representation or compressed pixel block comprises a configuration identifier of the symbol configuration selected in step S5. For instance, a 2-bit or 3-bit configuration identifier could be used when having four or eight different symbol configurations in the set. The compressed presentation also comprises a representation of the first, second and optional third pixel value components of the defined starting pixel. In an embodiment, there is a 1:1 relationship between the representation and the first, second pixel and optional third value components of the defined starting pixel. This means that the first, second and optional third pixel value components are preferably stored in the memory in uncompressed form. Thus, if the defined starting pixel has a RGB888 tupe as pixel value, the representation is preferably also a RGB888 tuple, i.e. spending 8 bits for each of the red, green and blue color components.

The compressed representation further comprises a first representation of the first prediction error, a second representation of the second prediction error and optionally a third representation of the third prediction error for each pixel in the pixel block except the defined starting pixel. In addition, the first representations in the compressed representation have maximally a same number of symbols, such as bits, as the first number of symbols of the selected symbol configuration identified by the configuration identifier, the second representations have maximally a same number of symbols as the second number of symbols of the selected symbol configuration and optionally the third representations have maximally a same number of symbols as the third number of symbols of the selected symbol configuration. In an embodiment, the first, second and optional third representations all have the same number of symbols as the first, second and optional third number of symbols, respectively.

FIG. 3 schematically illustrates an embodiment of a compressed representation 20 of a pixel block. The figure indicates the configuration identifier 21 and the representation 22-24 of the first, second and optional third pixel value components of the defined starting pixel. In FIG. 3, these pixel value components are denoted $R_{22}$ for the first or red pixel value component, $G_{22}$ for the second or green pixel value component and $B_{22}$ for the third or blue pixel value component of the defined starting pixel. The representations of the first, second and optional third prediction errors 25-27 are illustrated in FIG. 3 as $\epsilon_{ij}^R$, $\epsilon_{ij}^G$, $\epsilon_{ij}^B$, where i, j indicates the position or coordinate of a pixel in the pixel block, such as i= 1 ... 4, j=1 ... 4 for the pixel block in FIG. 2 with the proviso that (i, j)≠(2, 2) in this particular example since no prediction errors are calculated for the defined starting pixel at position (i, j)=(2, 2) in the pixel block.

The steps of the compressing method in FIG. 1 are preferably repeated for each pixel block to be compressed as indicated by the line L2. In a particular embodiment, the pixel blocks form parts of a pixel value buffer, such as a color buffer. In such a case, the loop of steps S1 to S6 could be conducted for each pixel block in the pixel value buffer to thereby get a compressed or encoded pixel value buffer. Generally, color buffer compression is ongoing when drawing the desired picture so that one or a few pixel blocks are drawn, the drawn pixel block(s) are compressed and the compressed pixel block(s) are written to the color buffer. The procedure continues by drawing a new pixel block.

In a particular embodiment, the total size of a compressed representation of a pixel block is preferably fixed if the pixel block can be compressed. This means that each pixel block of a pixel value buffer compressed according to FIG. 1 advantageously have a same size in terms of the total number of symbols, such as bits. Non-limiting examples of such fixed sizes include 128 bits or 256 bits. Alternatively, there can be a choice between, for instance, 128 bits and 256 bits. Usage of a fixed size for the compressed representations enables random access of the symbols, such as bits, of a compressed representation in the memory. Thus, the address in the memory of a particular compressed representation can easily be calculated since all compressed representations preferably have the same size.

The calculations of the prediction errors for the pixels in FIG. 1 are conducted based on the pixel value components of a respective prediction pixel assigned or selected for the current pixel. In an embodiment, all pixels in the pixel block for which prediction errors are calculated use the same prediction pixel, i.e. the defined starting pixel. The prediction errors could then be defined as:

$dR_{ij}=R_{ij}-R_{22}$ $ddG_{ij}=G_{ij}-G_{22}-dR_{ij}=G_{ij}-G_{22}-(R_{ij}-R_{22})$ $ddB_{ij}=B_{ij}-B_{22}-dR_{ij}=B_{ij}-B_{22}-(R_{ij}-R_{22})$ where $R_{ij}$, $G_{ij}$, $B_{ij}$ denotes the pixel value of a pixel at position or coordinate (i, j) in the pixel block, $R_{22}$, $G_{22}$, $B_{22}$ denotes the pixel value of the defined starting pixel in the pixel block and $dR_{ij}$, $ddG_{ij}$, $ddB_{ij}$ denotes the prediction errors of the pixel at position (i, j) in the pixel block. If the pixel block size of FIG. 2 is assumed (i, j)=(1, 1) ... (4, 4) with the proviso that (i, j)≠(2, 2) in this example since the defined starting pixel occupies the pixel position (2, 2).

In an alternative embodiment, the calculation of the prediction errors is based on a multi-step, such as two-step, prediction. In such a case, the prediction pixel of a pixel is the defined starting pixel for all pixels in the pixel block that are adjacent to or neighbors to the defined starting pixel. For instance, assume that the defined starting pixel 10 occupies the position (2, 2) in the pixel block 1 of FIG. 2. In such a case, the pixels at positions (1, 1), (1, 2), (1, 3) (2, 1), (2, 3), (3, 1), (3, 2) and (3, 3) in the pixel block 10, including the pixel 14, will use the defined starting pixel 10 as prediction pixel. The remaining pixels, including the pixel 12, are all predicted from the closest center pixel. The pixels at positions (4, 1) and (4, 2) will use the pixel at position (3, 2) as prediction pixel, the pixels at positions (4, 3), (4, 4) and (3, 4) will use the pixel at position (3, 3) as prediction pixel and the pixels at positions (1, 4) and (2, 4) will use the pixel at position (2, 3) as prediction pixel.

In an alternative approach, the three central pixels are predicted from the defined starting pixel, i.e. the pixels at positions (2, 3), (3, 2) and (3, 3). The ten pixels at the border of the pixel block are then predicted from the closest central pixel. This means that the pixel at position (3, 2) will be prediction pixel for the pixels at positions (3, 1), (4, 1) and (4, 2), the pixel at position (3, 3) will be prediction pixel for the pixels at positions (4, 3), (4, 4) and (3, 4), the pixel at position (2, 3) will be prediction pixel for the pixels at positions (1, 3), (1, 4) and (2, 4) and the pixel at position (2, 2), i.e. the defined starting pixel in this example, will be the prediction pixel of the pixels at positions (1, 1), (1, 2) and (2, 1).

For a pixel block of 4×4 pixels or smaller the prediction will, in this embodiment, be at most a two-step prediction. For larger pixel blocks, the prediction can be in more than two steps for at least some of the pixels in the pixel block.

The advantage of this approach as compared to using the defined starting pixel as prediction pixels for all other pixels in the pixel block is that each pixel is now predicted from one of its neighbors. This generally leads to smaller prediction errors and higher compression rates.

The defined starting pixel could be a pixel at a defined position in the pixel block. This defined position is preferably one of the central four positions, i.e. (2, 2), (2, 3), (3, 2) or (3, 3) in the pixel block 1 of FIG. 2. One and the same defined position is then advantageously used for all pixel blocks to be compressed. This means that no identification of the position of the defined starting pixel is needed in the compressed representation of the pixel block.

Figure 4:
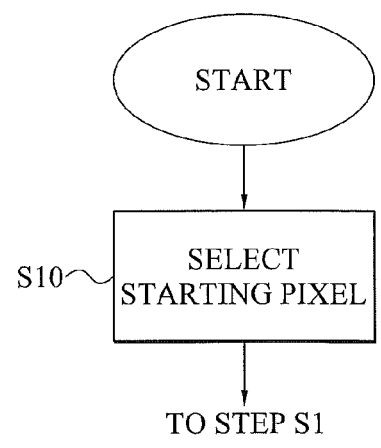
FIG. 4 is a flow diagram illustrating an additional, optional step of the method in FIG. 1.

In an embodiment as illustrated in FIG. 4, the method starts in step S10 by selecting one pixel of at least a subset of the pixels in the pixel block as the defined starting pixel. The method then continues to step S1 of FIG. 1. The pixel could be selected among all the pixels in the pixel block. Alternatively only a subset of the pixels in the pixel block could be available for selection. For instance, the selection of the defined starting pixel could be limited among only the four central pixels in the pixel block. Other variants include selecting among only every second or fourth pixel in the pixel block.

The reason behind limiting the number of pixels to select among is to reduce the size of a pixel identifier required to identify the position of the defined starting pixel in the pixel block. For instance, if the pixel block comprises 4×4 pixels and the defined starting pixel can be selected among all these 16 pixels a 4-bit pixel identifier is required. However, if only every second or fourth pixel could be selected, the pixel identifier needs only to be 3 or 2 bits. Only a 2-bit pixel identifier is also required if the selection of the defined starting pixel is among the central four pixels.

The compressed representation 20 then preferably comprises the pixel identifier 28 in addition to the configuration identifier 21, the representation 22-24 of the pixel value of the defined starting pixel and the representations 25-27 of the prediction errors for each pixel except the defined starting pixel as illustrated in FIG. 3.

Figure 5:
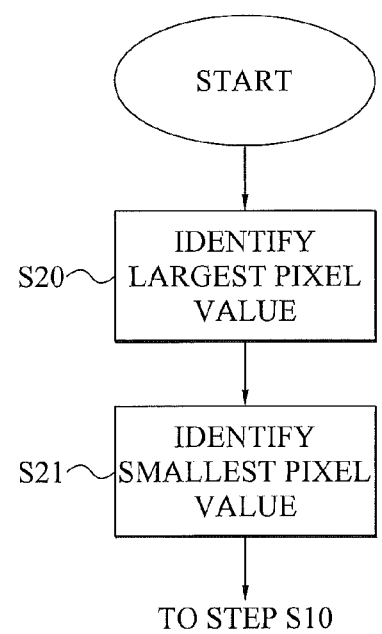
FIG. 5 is a flow diagram illustrating additional steps of the method in FIG. 4.

The selection of the defined starting pixel in step S10 is preferably performed based on the pixel value of the selected pixel. FIG. 5 is a flow diagram illustrating an embodiment of how the pixel value could be used to select the defined starting pixel for a pixel block. The method starts in step S20 where the largest pixel value in the pixel block is identified. A next step S21 identifies the smallest pixel value in the pixel block. The two steps can be conducted serially in any order or indeed in parallel. The method then continues to step S10 of FIG. 4. The defined starting pixel is then selected as the pixel among the at least a subset of the pixels in the pixel block that has a pixel value that is closest to the average of the largest pixel value and the smallest pixel value. Thus, the absolute differences between the average and the respective pixel values for each of the pixels in the at least a subset of the multiple pixels are calculated and the pixel resulting in smallest absolute difference is selected as defined starting pixel for the pixel block. A pixel identifier defining the position of the selected pixel in the pixel block is provided and included in the compressed representation of the pixel block.

Figure 6:
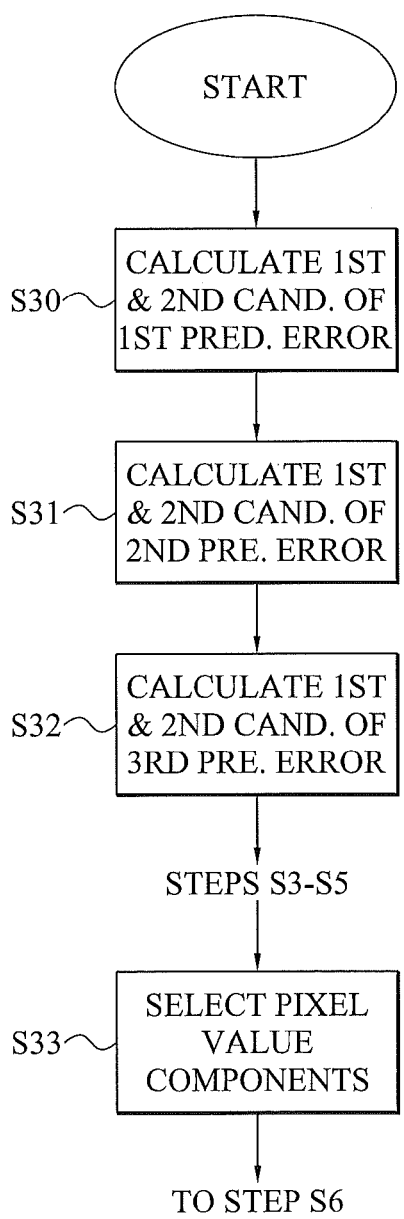
FIG. 6 is a flow diagram illustrating an embodiment of calculating prediction errors in FIG. 1.

In an embodiment, the first pixel value components are predefined to be one of the pixel value components for all pixel blocks to be compressed. For instance, the first pixel value components could be the red color components. An alternative is to have a selection of which pixel value component that should be the first pixel value component and which pixel value component that should be the second pixel value component. If the pixels each have a respective RGB tuple as pixel value, the selection of the first pixel value component could be among the red and the green color components, with the non-selected one being the second pixel value component and the blue color component as the third pixel value component. FIG. 6 illustrates this concept.

The method starts in step S30 that calculates first and second candidates of the first prediction error for each pixel in the pixel block except the defined starting pixel. The first candidate of the first prediction error is calculated based on the red color component of the pixel and the red color component of the prediction pixel assigned to the pixel. The second candidate of the first prediction error for the pixel is calculated based on the green color component of the pixel and the green color component of the prediction pixel assigned to the pixel.

The next step S31 calculates the first and second candidates of the second prediction error for each pixel in the pixel block except the defined starting pixel. The first candidate of the second prediction error is calculated based on the green color component of the pixel, the green color component of the prediction pixel assigned to the pixel and the first candidate of the first prediction error. The second candidate of the second prediction error is calculated based on the red color component of the pixel, the red color component of the prediction pixel assigned to the pixel and the second candidate of the first prediction error.

The next step S32 calculates the first and second candidates of the third prediction error for each pixel in the pixel block except the defined starting pixel. The first candidate of the third prediction error is calculated based on the blue color component of the pixel, the blue color component of the prediction pixel assigned to the pixel and the first candidate of the first prediction error. The second candidate of the third prediction error is calculated based on the blue color component of the pixel, the blue color component of the prediction pixel assigned to the pixel and the second candidate of the first prediction error. Steps S31 and S32 can be conducted serially in any order or indeed at least partly in parallel. In addition, steps S31 and S32 can be performed at least partly in parallel with step S30 in similarity to steps S1 and S2 of FIG. 1 as discussed in the foregoing.

The method then continues by steps S3-S5 of FIG. 1 in order to select symbol configuration for the two candidates. The method returns back to step S33, which selects whether the red or green component should be the first pixel value component for the pixel block based on the calculated first and second candidates of the first, second and third prediction errors. In an embodiment, it is investigated whether first candidates and the second candidates of the prediction errors can be represented using any of the symbol configurations. It could then be possible that a matching symbol configuration can only be found when employing the second candidates of the first, second and third prediction errors.

In an alternative approach, the selection of pixel value components in step S33 could be conducted without first selecting symbol configurations. This is possible if the maximum numbers of symbols required for representing the three prediction errors for one of the candidates are smaller than the corresponding maximum number of symbols required for representing the prediction errors for the other candidate.

In an alternative embodiment, the pixel block is first compressed by calculating the first candidates of the first prediction errors, the second prediction errors and the optional third prediction errors. If the pixel block can be successfully compressed down to a target bit size the second candidates of the prediction errors are never calculated. However, if the total resulting size of the compressed representation of the pixel block exceeds the target bit size, the second candidates of the first and second prediction errors are calculated to test whether the target bit size can be achieved. Thus, in this embodiment, the pixel block is first compressed by calculating the first prediction errors using the red component and then calculating the second and optional third prediction errors for the green and blue components. If the total size of the compressed representation exceeds the predefined target bit size, the pixel block is one more compressed by instead calculating the first prediction errors using the green component and then calculating the second and optional third prediction errors for the red and blue components.

The method continues to step S6 of FIG. 1. The compressed representation 20 of the pixel block in FIG. 3 also comprises, in this embodiment, a color identifier 29, such as a 1-bit identifier, to indicate whether the first pixel value components selected in step S34 are red or green.

Figure 7:
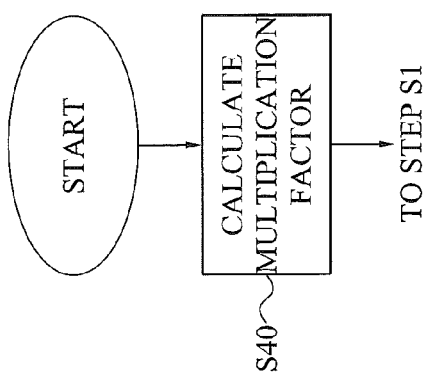
FIG. 7 is a flow diagram illustrating an additional, optional step of the method in FIG. 1.

FIG. 7 illustrates the concept of using a different prediction for the second prediction error and optionally the third prediction error. Rather than assuming that the difference from the defined starting pixel is the same as for the first prediction error, it is assumed in this concept that it is a multiple of the difference. This generally leads to better predictions but requires determining a multiplication factor before the prediction can be performed. The method therefore starts in step S40 where the multiplication factor is calculated as a quotient between the difference between the second pixel value component of a first pixel in the pixel block and the second pixel value component of a second pixel in the pixel block and the difference between the first pixel value components of the first pixel and the second pixel. The quotient can be used directly as multiplication factor. However, it could be beneficial to clamp the quotient to keep it somewhat close to one. An example of clamping interval could be the range of 0.4 to 1.4. Thus, if the quotient is larger than 1.4 or smaller than 0.4, 1.4 or 0.4 is used as multiplication factor. This leads to higher compression efficiency but at the cost of reduced parallelism and increased complexity.

The calculation of the second prediction error for a pixel then comprises calculating the second prediction error based on a difference between the second pixel value component of the pixel and the second pixel value component of the prediction pixel assigned to the pixel and the first prediction error multiplied by the multiplication factor.

A corresponding multiplication factor can be used also for the optional third prediction errors. This multiplication factor is then calculated as the quotient between the difference between the third pixel value components of the first and second pixels and the difference between the first pixel value components of the first and second pixels. Optional clamping of the quotient can be applied as in above. The calculation of the optional third prediction error for a pixel then comprises calculating the third prediction error based on a difference between the third pixel value component of the pixel and the third pixel value component of the prediction pixel assigned to the pixel and the first prediction error multiplied by the multiplication factor calculated for the third pixel value components.

Embodiments can utilize clamping of the predicted value depending on the number of symbols maximally available to represent the prediction error. Such clamping increases the chances of losslessly compressing the pixel block. For example, assume that the defined starting pixel has color value (150, 107, 243) and the selected symbol configuration is (5, 4, 4). The red component of all pixels in the block except the defined starting pixel will be predicted as 150. If the red component of a pixel was 162, the first prediction error would be +12 and the prediction for the green component of the pixel would be 107+19=119. If 4 bits are maximally available for representing the second prediction errors according to the selected symbol configuration above, the green component of the pixel must lie between 111 and 126 or the pixel block cannot be losslessly compressed. The prediction for the blue component of the pixel would likewise be 243+12=255. If 4 bits are maximally available for representing the third prediction errors it would be possible to encode blue component values between 247 and 262. However, if the original RGB values are RGB888 values the actual range is between 0 and 255. It could therefore be beneficial to clamp the prediction to 248 and, thus, get a range of possible blue component values between 240 and 255 instead, which increases the chances of being able to compress the pixel block.

Figure 8:
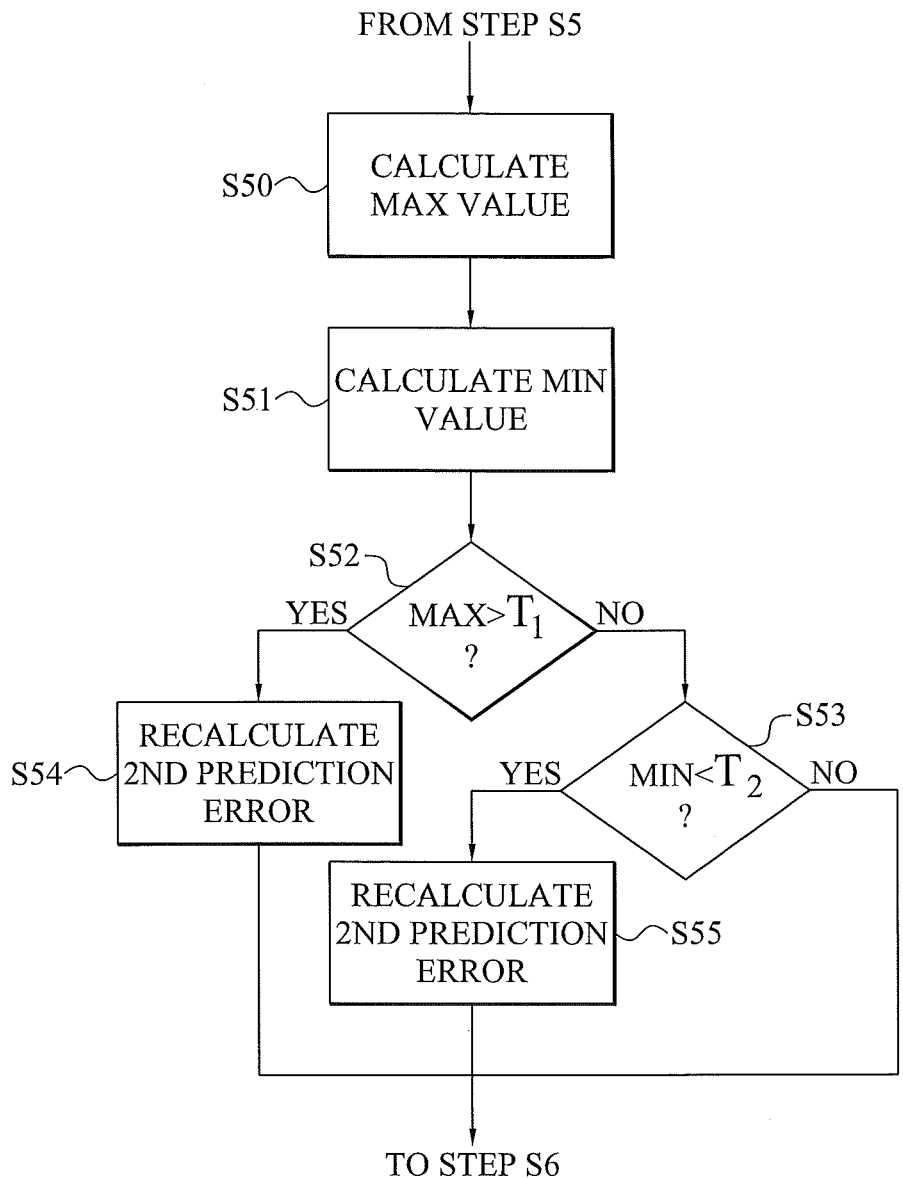
FIG. 8 is a flow diagram illustrating additional, optional steps of the method in FIG. 1.

FIG. 8 is a flow diagram illustrating additional steps of the method that can achieve the above described clamping. The method continues from step S5 in FIG. 1. A next step S50 calculates a maximum value for each pixel in the pixel block except the defined starting pixel. The maximum value is calculated based on the sum of the second pixel value component ($G_{22}$) of the defined starting pixel, the first prediction error ($dR_{ij}$) calculated for the pixel and the largest value ($S_M$) representable by the second number of symbols available for the second prediction errors as defined by the selected symbol configuration. The maximum value is preferably calculates as $MAX=G_{22}+dR_{ij}+S_M$. Step S51, conducted prior, after or at least partly in parallel with step S50, correspondingly calculates a minimum value for each pixel except the defined starting pixel. The minimum value is calculated based on the second pixel value component of the defined starting pixel, the first prediction error calculated for the pixel and the smallest value ($S_m$) representable by the second number available for the second prediction errors according to the selected symbol configuration. The minimum value is preferably calculated as $MIN=G_{22}+dR_{ij}+S_m$. In this case $S_m$ is typically negative.

A next step S52 compares the maximum value calculated in step S50 with a maximum threshold ($T_1$). This maximum threshold is typically set equal to the largest possible value of a pixel value component. For instance, if a pixel value component is represented as an 8-bit word the maximum threshold is preferably $2^8-1=255$.

If the maximum value does not exceed the maximum threshold the method continues to step S53, where the minimum value is compared with a minimum threshold ($T_2$). The minimum threshold is preferably equal to the smallest possible value of a pixel value component, typically zero.

If neither the maximum value exceeds the maximum threshold or the minimum value is below the minimum threshold for the given pixel the method continues to step S6 of FIG. 1 and no recalculation of the second prediction error and clamping is necessary.

However, if the maximum value for any of the pixels in the pixel block except the defined starting pixel exceeds the maximum threshold in step S52, step S54 recalculates the second prediction error for that pixel. The second prediction error is preferably recalculated based on a difference between the second pixel value component ($G_{ij}$) of the pixel and a difference between the maximum threshold ($T_1$) and the largest value ($S_M$) representable by the second number of symbols available for the second prediction errors according to the selected symbol configuration. In a preferred embodiment, $ddG_{ij}=G_{ij}-(T_1-S_M)$. Thus, in this embodiment the prediction value employed for any of the pixels will not exceed the maximum threshold, such as 255.

The recalculation in step S54 is preferably for all pixels in the pixel block for which the maximum value calculated in step S50 exceeds the maximum threshold.

Correspondingly, if the minimum value calculated for at least one pixel in the pixel block is below the minimum threshold, the method continues from step S53 to step S55 where the second prediction error is preferably recalculated for the pixel. The second prediction error is recalculated based on a difference between the second pixel value component of the pixel and a difference between the minimum threshold ($T_2$) and the smallest value ($S_m$) representable by the second number of symbols available for the second prediction errors according to the selected symbol configuration. In a preferred embodiment, $ddG_{ij}=G_{ij}-(T_2-S_m)$.

The method then continues from step S54 or S55 to step S6 in FIG. 1.

The order of steps S52 and S53 can also be interchanged so that the minimum value is investigated before the maximum value.

The method steps described above in connection with FIG. 8 can optionally be conducted serially or in parallel for the optional third pixel value component. The steps are then basically the same as in above but uses the third pixel value component and the largest/smallest value representable by the third number of symbols available for the third prediction errors instead of the second pixel value components and the second number of symbols.

Some pixel blocks could fail to be compressed at certain number of symbols as defined by the symbol configurations of the set because one or a few pixels are very different from the prediction pixel. An example of that is illustrated below.

| (153, 83, 75) | (150, 80, 72) | (155, 85, 77) | (155, 85, 77) |
| (155, 85, 77) | (153, 83, 75) | (150, 80, 72) | (150, 85, 60) |
| (155, 85, 77) | (150, 80, 70) | (150, 80, 72) | (155, 85, 77) |
| (150, 80, 72) | (150, 80, 72) | (150, 80, 72) | (155, 85, 77) |

The above described table is an example of a pixel block with the defined starting pixel marked in bold lines. In a first step, the pixel value components of the defined starting pixel are subtracted from the pixel value components of the other pixels to get:

| (0, 0, 0) | (-3, -3, -3) | (2, 2, 2) | (2, 2, 2) |
| (2, 2, 2) | (153, 83, 75) | (-3, -3, -3) | (2, 2, -15) |
| (2, 2, 2) | (-3, -3, -5) | (-3, -3, -3) | (2, 2, 2) |
| (-3, -3, -3) | (-3, -3, -3) | (-3, -3, -3) | (2, 2, 2) |

The first prediction errors are then subtracted from the second and third channels to get the final prediction errors:

| (0, 0, 0) | (-3, 0, 0) | (2, 0, 0) | (2, 0, 0) |
| (2, 0, 0) | (153, 83, 75) | (-3, 0, 0) | (2, 0, -17) |
| (2, 0, 0) | (-3, 0, -2) | (-3, 0, 0) | (2, 0, 0) |
| (-3, 0, 0) | (-3, 0, 0) | (-3, 0, 0) | (2, 0, 0) |

In this example, it is evident that the third prediction error for the pixel at position (2, 4) differs quite significantly from the other pixels. Except for this pixel all the other third prediction errors could have been compressed using only two bits capable of representing the values −2, −1, 0 and 1.

Figure 9A:
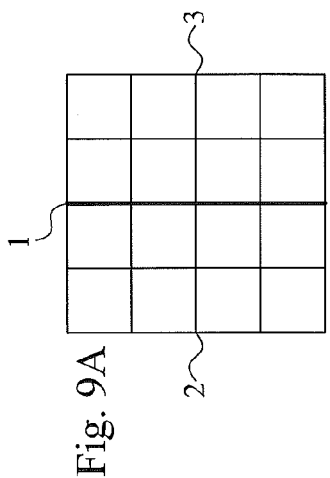
FIGS. 9A to 9C illustrate various embodiments of defining sub-blocks for a pixel block.
Figure 9B:
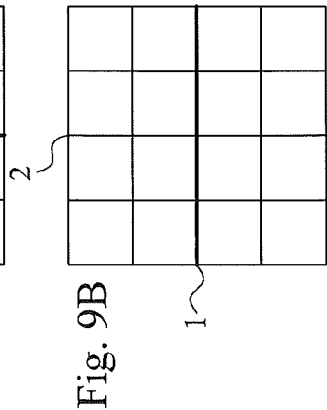
Figure 9C:
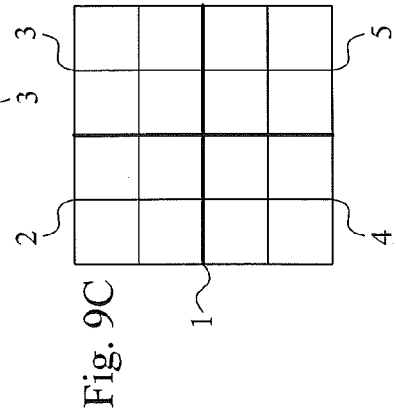

If the pixel block comprises one or a few odd pixel values components giving rise to large prediction errors it can be advantageous to spend more symbols, such as bits, in one part of the pixel block at the cost of the number of symbols that will be maximally available for representing prediction errors in another part of the pixel block. FIGS. 9A to 9C illustrate various embodiments of defining different sub-blocks in a pixel block. In FIG. 9A the pixel block 1 consists of a first or left sub-block 2 and a second or right sub-block 3. In FIG. 9B the sub-blocks 2, 3 are instead a first or upper sub-block 2 and a second or lower sub-block 3. These two concepts can be combined as illustrated in FIG. 9C to have four sub-blocks 2-5 in the pixel block 1. It could also be possible to divide the pixel block in three sub-blocks of five pixels each. An example of such a division is to assign pixels at positions (1, 1), (1, 2), (1, 3), (2, 1), (3,1) could belong to the first sub-block, pixels at positions (1, 4), (2, 3), (2, 4), (3, 4), (4, 4) belong the second sub-block and pixels at positions (3, 2), (3, 3), (4, 1), (4, 2), (4, 3) belong to the third sub-block with the defined starting pixel at position (2, 2). The embodiments therefore also encompass non-quadratic sub-blocks.

In these embodiments the calculation of the prediction errors are basically conducted as previously described herein. The determination of the minimum number of symbols in steps S3 and S4 of FIG. 1, however, comprises determining a first minimum number of symbols required for representing the first prediction errors calculated for the pixels present in the first pixel sub-block, of course excluding the defined starting pixel if it is present in the first pixel sub-block. A corresponding first minimum number of symbols required for representing the first prediction errors for the pixels in the second pixel sub-block is also determined. Second and optional third minimum numbers of symbols required for representing the second and optional third prediction errors calculated for pixels in the first pixel sub-block and for the pixels in the second pixel sub-block are also determined. This means that each pixel sub-block will have a determined first, second and optionally third minimum number of symbols. The determined first, second and optional third minimum numbers of symbols for the pixel sub-blocks are then employed in step S5 for selecting which symbol configuration of the set to use.

In this embodiment, each symbol configuration comprises at least two parts, one listing first, second and optional third numbers of symbols maximally available for the prediction errors of the pixels in the first pixel sub-block and another listing corresponding first, second and optional third numbers of symbols maximally available for the prediction error of the pixels in the second pixel sub-block.

For instance, if a traditional symbol configuration, i.e. without using any pixel sub-regions, would be [4, 2, 3] more bits could be spent on the second, here right (R), pixel sub-block at the cost of the first, here left (L), pixel sub-block with a symbol configuration of [3L 4R, 1L 2R, 2L 6R]. This means that maximally 3, 1 and 2 bits are available for representing the first, second and third prediction errors for the pixels in the left pixel sub-block, whereas the pixels in the right sub-block can maximally spend 4, 2 and 6 bits on the first, second and third prediction errors. This symbol configuration is very suitable for the situation presented above with a comparatively large third prediction error in the right sub-block.

In an embodiment, only a single sub-block configuration is possible such as the one in FIG. 9A or in FIG. 9B. The selection whether to the use sub-block configuration or not is then dependent on which symbol configuration that is selected. For instance, if the set consists of eight possible symbol configurations, six of these could spend the same number of symbols on the prediction errors in both halves of the pixel block. However, one of the symbol configurations spend more symbols on the first of the halves at the expense of the number of symbols available for representing the prediction errors in the second half of the pixel block. The last symbol configuration then spends more symbols on the second half at the expense of the first half of the pixel block. If one of the six symbol configurations is selected the pixel block will not have any pixel sub-blocks, whereas if one of the remaining two symbol configurations is selected the pixel block consists of two pixel sub-blocks.

Alternatively, the pixel block could always consist of, for instance two, pixel sub-blocks. A 1-bit sub-block identifier can then be used to differentiate between sub-block configurations according to FIG. 9A and FIG. 9B. If more configurations are possible larger sub-block identifiers are required. In order to determine which sub-block configuration to use or indeed whether any sub-block configuration should be used at all the pixel block can first be compressed without any sub-block division. If the pixel block could not be losslessly compressed since no symbol configuration meets the demands of the number of symbols required to represent the calculated prediction errors, the pixel block could be compressed using sub-blocks and symbol configurations adapted for handling sub-block configurations.

The compressed representation of the pixel block then optionally comprises a sub-block identifier identifying that the particular sub-block configuration selected for the pixel block.

There is actually possible to skip the 1-bit sub-block identifier also for this embodiment. In such a case, the set of symbol configurations comprise at least one symbol configuration spending the same number of symbols on both sub-blocks, at least one symbol configuration spending more symbols on one of the sub-blocks in FIG. 9A than the other sub-block and at least one symbol configuration spending more symbols on one of the sub-blocks in FIG. 9B than the other sub-block. Thus, by selecting the particular symbol configuration an inherent signaling of the sub-block configuration in FIG. 9A or FIG. 9B is obtained.

Figure 10:
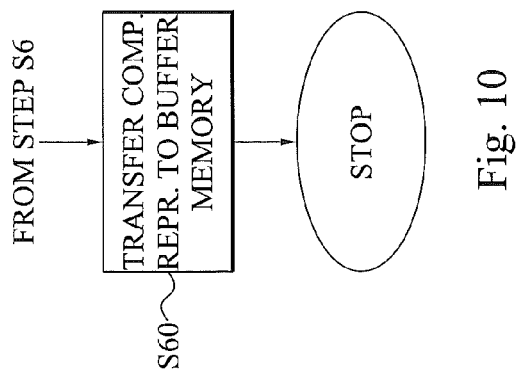
FIG. 10 is a flow diagram illustrating an additional, optional step of the method in FIG. 1.

FIG. 10 is a flow diagram illustrating an additional, optional step of the compression method. This embodiment is useful if the pixel block constitutes a part of a pixel value buffer, such as a color buffer. The method then continues from step S6 in FIG. 1 and proceeds to step S60 of FIG. 10. There the compressed representation of the pixel block is transferred from the memory, preferably implemented in a graphical processing unit (GPU), over a data bus to a buffer memory storing the compressed pixel value buffer.

Decompression

Figure 11:
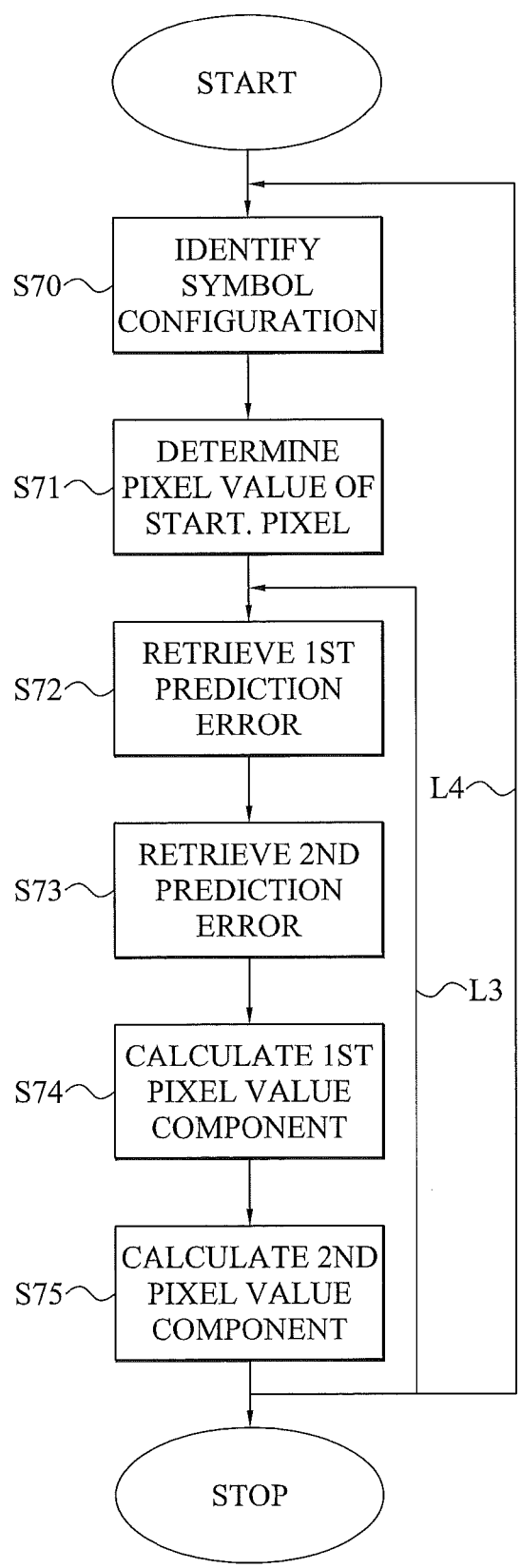
FIG. 11 is a flow diagram illustrating a method of decompressing a compressed representation of a pixel block according to an embodiment.

The decompression of the compressed representation of the pixel block is basically the inverse of the compression steps. FIG. 11 is a flow diagram illustrating a method of decompressing a compressed representation of a pixel block. The method starts in step S70 that identifies a symbol configuration for the pixel block based on a configuration identifier included in the compressed representation. The symbol configuration defines, as previously described, a first, second and optional third numbers of symbols available for first, second and optional third prediction errors of the pixels.

A next step S71 that can be conducted prior, after or at least partly in parallel with step S70 determines first, second and optional third pixel value components for a defined starting pixel in the pixel block. These pixel value components are determined based on a representation of the pixel value components included in the compressed representation. In a preferred embodiment, the retrieved representation of the pixel value components can be used directly as pixel value components of the defined starting pixel. If the position of the defined starting pixel is not fixed in the pixel block, a pixel identifier in the compressed identifier can be used to identify the position of the defined starting pixel in the pixel block.

The next step S72 retrieves a first representation of a first prediction error from the compressed representation based on the first number of symbols defined by the symbol configuration identified in step S70. Thus, the position of the particular pixel in the pixel block and this first number of symbols enables identification of which part of the sequence of symbols, typically bit sequence, constituting the compressed representation that corresponds to the first prediction error of the pixel. Step S73 correspondingly retrieves a second representation of a second prediction error for the pixel from the compressed representation based on the second number of symbols defined by the symbol configuration identified in step S70. The position of the pixel together with the second number of symbols enables identification of the second representation in the compressed representation. Step S73 can be conducted prior, after or at least partly in parallel with step S72.

If the pixels each comprise more than two pixel value components, such as three components, a further step of retrieving the third prediction error is conducted in the same way as step S72 but using a third number of symbols defined by the symbol configuration identified in step S70 to identify the third prediction error.

The next two steps S74 and S74, which can be conducted serially in any order or at least partly in parallel, calculates the pixel value components of the pixel. Step S74 calculates the first pixel value component of the pixel based on the first representation of the first prediction error of the pixel and a first pixel value component of a prediction pixel assigned to the pixel. As previously discussed this prediction pixel is either the defined starting pixel or a previously decompressed neighboring pixel in the pixel block. In an embodiment, the first pixel value component ($R_{ij}$) is calculated as $R_{ij} = dR_{ij} + R_{22}$, where $R_{22}$ represents the first pixel value component of the prediction pixel. Step S75 calculates the second pixel value component of the pixel based on the first representation of the first prediction error and the second representation of the second prediction error of the pixel and the second pixel value component of the prediction pixel. In an embodiment, the second pixel value component ($G_{ij}$) is calculated as $G_{ij} = ddG_{ij} + G_{22} + dR_{ij}$, where $G_{22}$ represents the second pixel value component of the prediction pixel.

A further optional step also calculates the third pixel value component for the pixel in a similar way as step S75 but using the third prediction error ($ddB_{ij}$) of the pixel, the third pixel value component ($B_{22}$) of the prediction pixel and the first prediction error of the pixel, i.e. preferably as $B_{ij} = ddB_{ij} + B_{22} + dR_{ij}$.

Steps S72 to S75 are then repeated for all pixels in the pixel block except the defined starting pixel, which is schematically illustrated by the line L3. The method of FIG. 11, i.e. steps S70 to S75, can then be repeated for at least one other compressed representation to be compressed, as illustrated by the line L4.

Implementation Aspects

Figure 12:
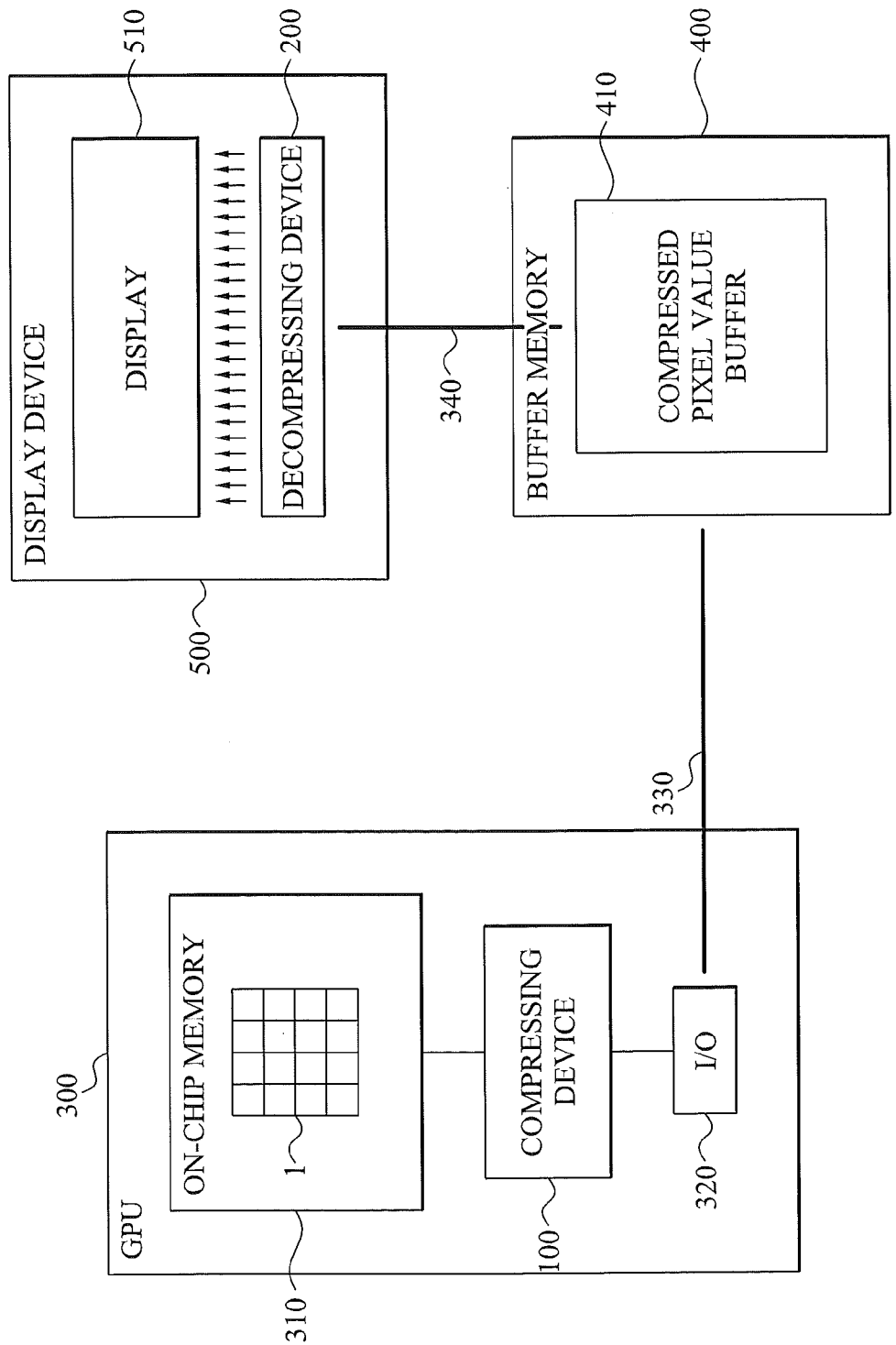
FIG. 12 is a schematic overview of a system for displaying images according to an embodiment.

FIG. 12 is an overview of a graphics system according to an embodiment. The graphics system comprises three main units or entities: a graphical processing unit 300, denoted GPU in the figure, a buffer memory 400 and a display device 500 interconnected via data buses 330, 340. The graphics system can be implemented in any data processing unit or terminal, Non-limiting examples include computers, including laptops, game consoles, mobile telephones and other mobile processing units, such as personal digital assistants, iPad and other tablet computers.

The graphical processing unit 300 comprises an on-chip memory 310 configured to store a pixel block as it is being compressed by a compressing device 100. The resulting respective compressed representations are transferred from the on-chip memory 310 over the data bus 330 to the buffer memory 400 using a general input and output (I/O) device 320. The buffer memory 400 then comprises a pixel value buffer 410 provided in encoded and compressed form. When displaying data on a display 510 of the display device 500 or connected to the display device 500, encoded data corresponding to at least a part of the compressed pixel value buffer 410 is read from the buffer memory 400 and provided to a decompressing device 200 over a data bus 340. The decompressing device 200 decompresses the fetched encoded data in order to get pixel values that can be displayed on the display 510.

In alternative implementation embodiments, a single data bus is employed to transfer data from the GPU 300 to the buffer memory 400 and from the buffer memory 400 to the display device 500. It could also be possible to arrange the buffer memory 400 as a part of the display device 500.

Figure 32:
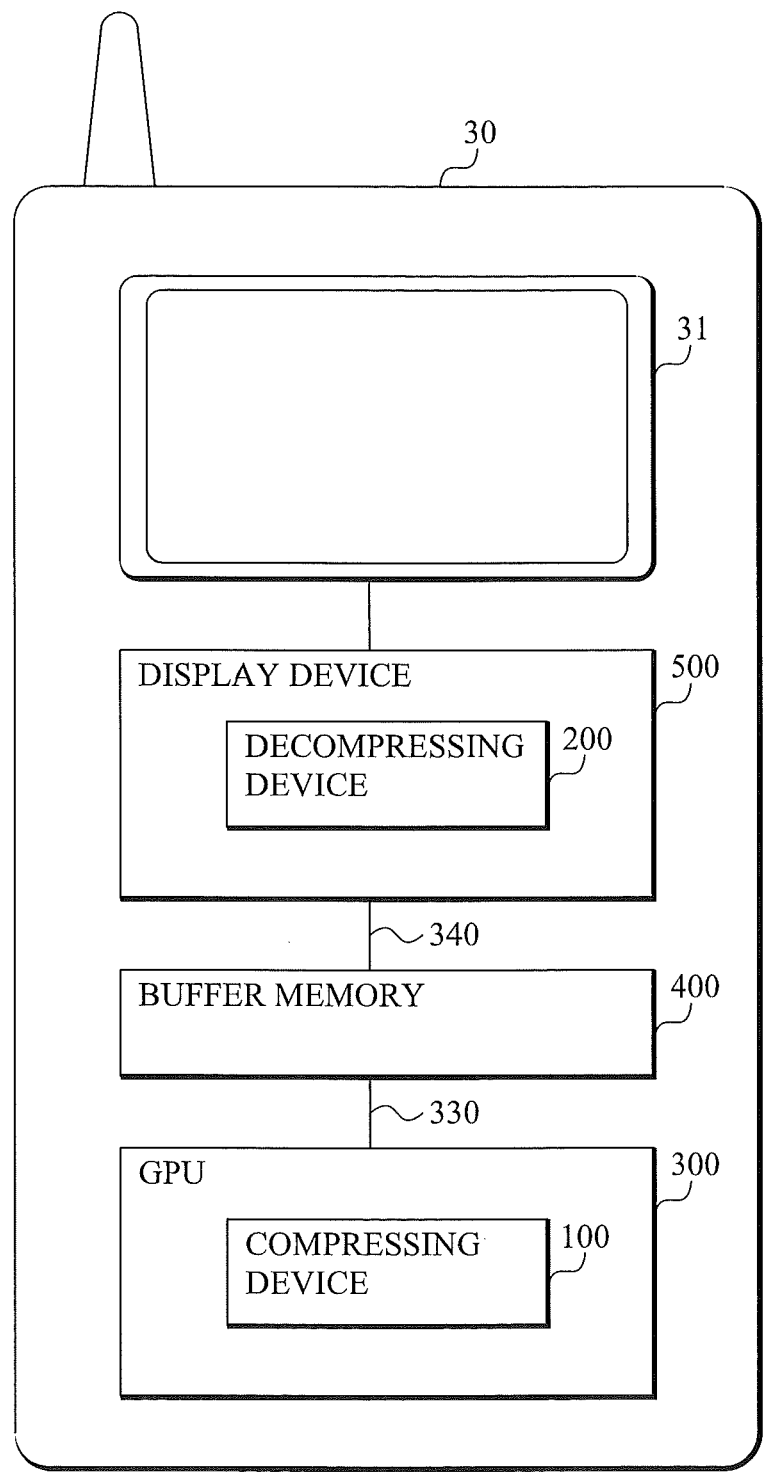
FIG. 32 is a schematic block diagram of a media terminal according to an embodiment.

FIG. 32 schematically illustrates a user terminal 30 in the form of a mobile telephone 30. The mobile telephone 30 comprises a GPU 300 with a compressing device 100. A data bus 330 interconnects the GPU 300 with a buffer memory 400, which in turn is connected to a display device 500 via a data bus 340. The display device 500 comprises a decompressing device 200 and has or is connected to a display 31.

Compressing Device

Figures 13, 14:
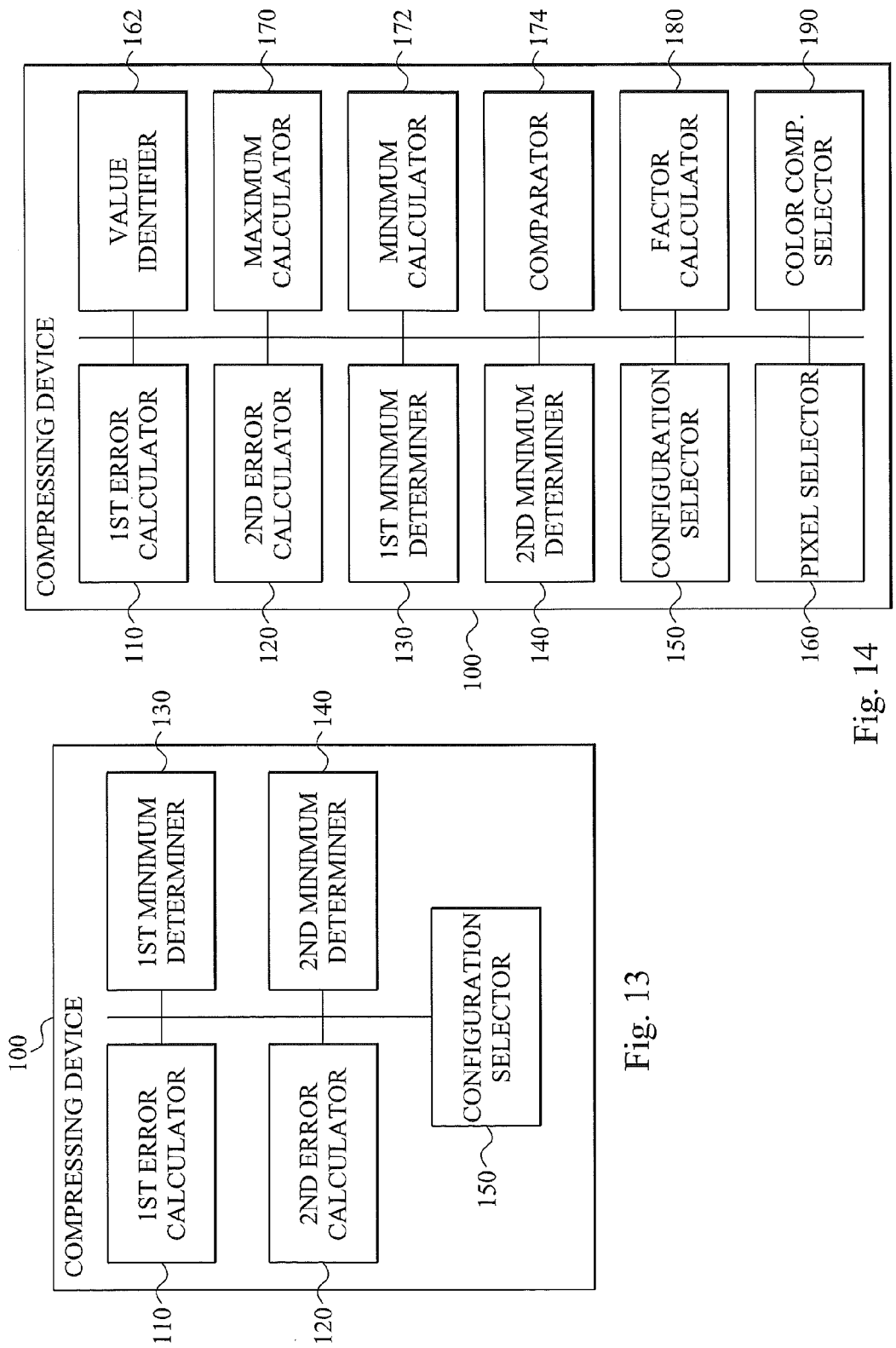
FIG. 13 is a schematic block diagram of a compressing device according to an embodiment.

FIG. 13 is a schematic block diagram of a compressing device 100 according to an embodiment, which advantageously can be implemented in the GPU of FIG. 12. The compressing device 100 comprises a first error calculator 110 configured to calculate a first prediction error for each pixel in a pixel block except a defined starting pixel. The first prediction error is calculated based on a first pixel value component of the pixel and a first pixel value component of a prediction pixel assigned to the pixel as previously described. A second error calculator 120 is configured to calculate a second prediction error for each pixel except the defined starting pixel in the block. The second prediction error is calculated as previously described based on the first and second pixel value component of the pixel and the first and second pixel value component of the prediction pixel. The second error calculator 120 optionally calculates the second prediction error based on the second pixel value component of the pixel, the second pixel value component of the prediction pixel and the first prediction error calculated by the first error calculator 110. If each pixel comprises more than two pixel value components, the compressing device 100 optionally comprises a third error calculator (not illustrated) for calculating a third prediction error for the pixel as previously described herein. Alternatively, the second error calculator 120 performs also performs the calculation of the third prediction errors.

A first minimum determiner 130 is configured to determine a first minimum number of symbols required for representing the first prediction errors calculated for the pixels by the first error calculator 110. The compressing device 100 also comprises a second minimum determiner 140 configured to determine a second minimum number of symbols required for representing the second prediction errors calculated for the pixels by the second error calculator 120. An optional third minimum determiner (not illustrated) could be implemented in the compressing device 100 if the pixels comprise three pixel value components. The third minimum determiner is then configured to determine a third minimum number of symbols required for representing the third predication errors calculated for the pixels. Alternatively, the operations and functions of the third minimum determiner can instead be conducted by the second minimum determiner 140.

The compressing device 100 further comprises a configuration selector 150 configured to select a symbol configuration for the pixel block among a set of multiple different symbol configurations. The configuration selector 150 uses the first, second and optionally third minimum number of symbols determined by the first and second minimum determiner 130, 140 to select the particular symbol configuration as previously described herein. The output of the compressing device 100 is a compressed representation of the pixel block and comprises a configuration identifier of the symbol configuration selected by the configuration selector 150, a representation of the first, second and optionally third pixel value component of the defined starting pixel, a first representation of the first prediction error calculated by the first error calculator 110, a second error representation of the second prediction error calculated by the second error calculator 120 and optionally a third representation of the third prediction error for each pixel in the pixel block except the defined starting pixel.

FIG. 14 is a schematic block diagram of another embodiment of a compressing device 100. The first and second error calculators 110, 120 calculate the first and second prediction errors, respectively, using the defined starting pixel as the prediction pixel for all pixels in the pixel block for which prediction errors are calculated. Alternatively, the first and second error calculators 110, 120 use a respective neighboring pixel in the pixel block as prediction pixel as previously described.

The position of the defined starting pixel in the pixel block could be fixed for all pixel blocks. Alternatively, the compressing device 100 comprises a pixel selector 160 configured to select one pixel of at least a subset of the pixels in the pixel block as the defined starting pixel as disclosed herein. The compressed representation then comprises a pixel identifier representing the position of the selected pixel in the pixel block. In an embodiment, the compressing device comprises a value identifier 162 configured to identify the largest and the smallest pixel value of the at least a subset of the pixels in the pixel block. The pixel selector 160 then selects the defined starting pixel to be the pixel of the at least a subset of the pixels that is closest to an average of the largest and smallest pixel values identified by the value identifier 162.

In an embodiment the compressing device 100 comprises a maximum calculator 170 configured to calculate a maximum value for each pixel in the pixel block except the defined starting pixel. The maximum value is based on and preferably equal to a sum of the second pixel value component of the defined starting pixel, the first prediction error calculated by the first error calculator 110 for the given pixel and a largest value representable by the second number of symbols available for the second prediction errors according to the symbol configuration selected by the configuration selector 150. A minimum calculator 172 is correspondingly implemented to calculate, for each pixel except the defined starting pixel, a minimum value based on, preferably equal to, a sum of the second pixel value component of the defined starting pixel, the first prediction error calculated for the pixel by the first error calculator 110 and a smallest value representable by the second number of symbols available for the second prediction errors according to the symbol configuration selected by the configuration selector 150.

A comparator 174 is preferably provided in the compressing device 100 for comparing the maximum values from the maximum calculator 170 with a maximum threshold and the minimum values from the minimum calculator 172 with a minimum threshold. If the maximum value of any of the pixels in the pixel block exceeds the maximum threshold the second error calculator 120 preferably recalculates the second prediction errors for the pixel based on a difference between the second pixel value component of the pixel and a difference between the maximum threshold and the largest value representable by the second number of symbols available for the second prediction errors according to the symbol configuration selected by the configuration selector 150. If, however, the minimum value of a pixel is below the minimum threshold the second error calculator 120 preferably recalculates the second prediction error for the pixel based on a difference between the second pixel value component of the pixel and a difference between the minimum threshold and the smallest value representable by the second number of symbols available for the second prediction errors according to the symbol configuration selected by the configuration selector 150.

If the pixels comprise a third pixel value component the maximum calculator 170, the minimum calculator 172 and the comparator 174 can calculate and compare maximum and minimum values for the third pixel value component in order to determine whether a recalculation of the third prediction errors is needed.

An embodiment of the compressing device 100 comprises a factor calculator 180 configured to calculate a multiplication factor as quotient between a difference between a second pixel value component of a first pixel in the pixel block and second pixel value component of a second pixel in the pixel block and a difference between a first pixel value component of the first pixel and a first pixel value component of the second pixel. The second error calculator 120 is then configured to calculate the second prediction error of a pixel based on a difference between the second pixel value component of the pixel and the second pixel value component of the prediction pixel and the first prediction error multiplied by the multiplication factor calculated by the factor calculator 180.

The factor calculator 180 could also calculate a second multiplication factor for any third pixel value component by replacing the second pixel value components of the first and second pixels with the corresponding third pixel value components. The compressing device 100 then calculates the third prediction error for a pixel based on a difference between the third pixel value component of the pixel and the third pixel value component of the prediction pixel and the first prediction error multiplied by the second multiplication factor calculated by the factor calculator 180.

In an embodiment a color ordering is possible as previously described, i.e. selecting whether to use the red channel or the green channel as the first pixel value component. The first and second error calculators 110, 120 then each calculate a first and second candidate of the first, second and optional third prediction error, respectively. The first candidates use red as the first pixel value component and green as the second pixel value component, whereas for the second candidates it is the other way around. A color component selector 190 of the compressing device 100 is configured to select the first pixel value component as one of the red and green color components based on the calculated first and second candidates of the first, second and third prediction errors are previously described herein. In this embodiment the second minimum determiner 140 or a third minimum determiner (not illustrated) determines a third minimum number of symbols required for representing the third prediction errors. The configuration selector 150 thereby uses this third minimum number together with the first and second minimum numbers when selecting which symbol configuration from the set to use for the current pixel block.

The compressed block comprises, in this embodiment, the configuration identifier, the representation of the red, green and blue color components of the defined starting pixel, a color identifier defining whether to use red or green as the first pixel value component and first, second and third representations of the first, second and third prediction errors for each pixel except the defined starting pixel.

If the pixel block comprises pixel sub-blocks as previously described the first and second minimum determiners 130, 140 determines first, second and optional third minimum numbers for each pixel sub-block as previously described. The configuration selector 150 thereby uses the two or more first minimum numbers, the two or more second minimum numbers and optionally the two or more third minimum numbers when selecting the particular symbol configuration for the pixel block. In this embodiment, the compressed representation of the pixel block might comprises an optional sub-block identifier to signal that the pixel block comprises at least two pixel sub-blocks.

The various additional units 160-190 of the compressing device 100 can be combined and omitted in various embodiments. This means that not all of the units 160-190 need to be implemented in the compressing device 100. Embodiments therefore encompass only comprising the pixel selector 160 and the value identifier 162, only comprising the maximum calculator 170, the minimum calculator 172 and the comparator 174, only comprising the factor calculator 180 or only comprising the color component selector 190 in addition to the units 110-150. Also variant comprising two or more combinations of the units 160-162, the units 170-172, the unit 180 and the unit 190 are possible and within the scope of the embodiments.

The units 110-190 of the compressing device 100 may be implemented or provided as hardware or a combination of hardware and software. In the case of a software-based implementation, a computer program product implementing the compressing device 100 or a part thereof comprises software or a computer program run on a general purpose or specially adapted computer, processor or microprocessor. The software includes computer program code elements or software code portions illustrated in FIG. 13 or 14. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server.

The units 110-190 of the compressing device 100 are preferably implemented in a graphical processing unit as illustrated in FIG. 12 and can be present on a graphics chip. In such a case, the units 110-190 are advantageously implemented in hardware.

Figure 15:
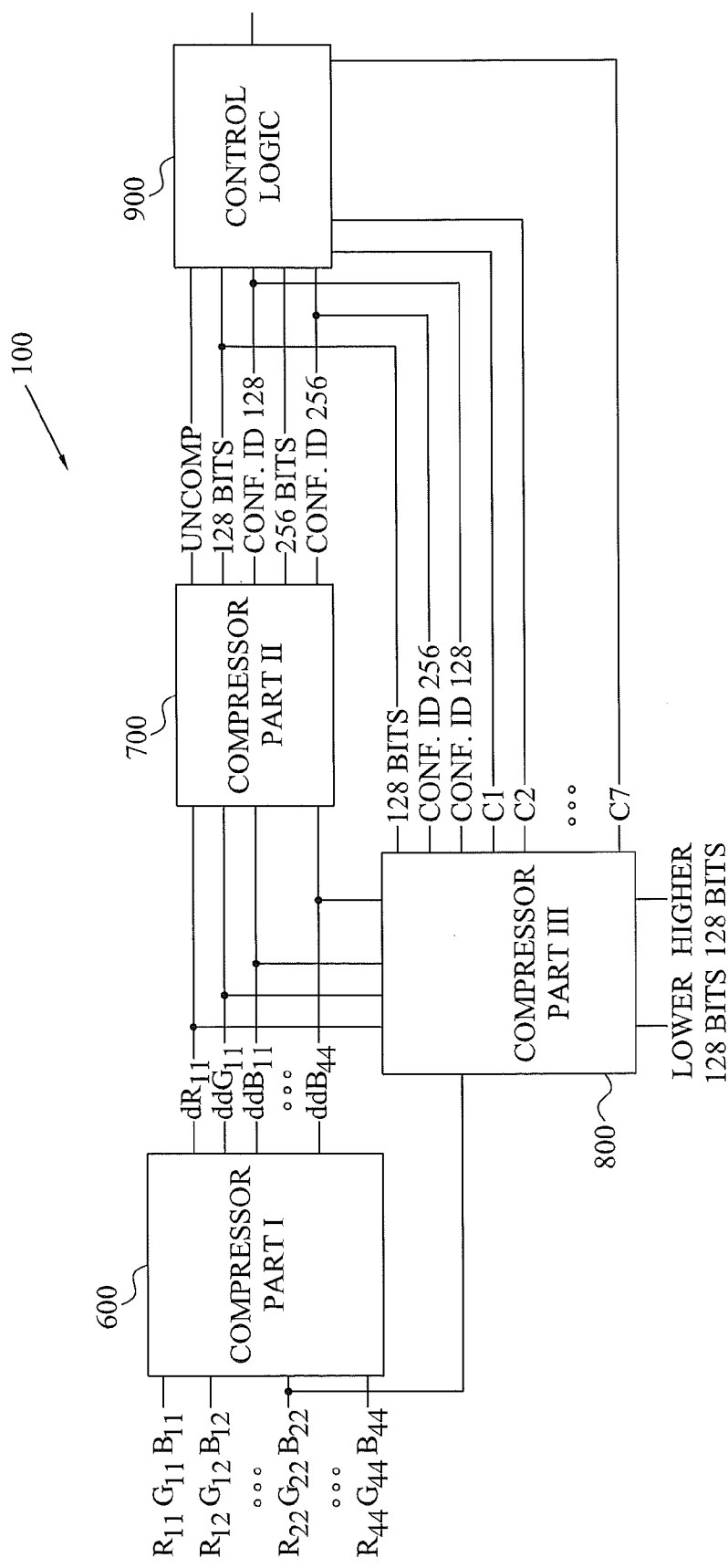
FIG. 15 illustrates a schematic hardware implementation of a compressing device according to an embodiment.

FIGS. 15-31 illustrate an embodiment of a hardware implementation of a compressing device 100. FIG. 15 illustrates that the compressing device 100 comprises four main parts denoted compressor part I 600, compressor part II 700, compressor part III 800 and control logic 900. The compressor part I 600 receives the original pixel values, here represented by RGB tuples, of the pixel block and outputs the first, second and third prediction errors. The compressor part II 700 receives these prediction errors and outputs control signals to the control logic including an 1-bit signal indicating whether the pixel block could be successfully compressed or not (denoted uncomp. in the figure), an 1-bit signal indicating whether the compressed representation should be 128 bits in size (denoted 128 bits), a 2-bit configuration identifier for the 128-bit mode, an 1-bit signal indicating whether the compressed representation should be 256 bits in size (denoted 256 bits) and a 3-bit configuration identifier for the 256-bit mode.

The control logic 900 in turn outputs various control signals C1-C7. The compressor part III 800 receives these output signals from the control logic 900 in addition to the original pixel values of the defined starting pixel and the outputs from the compressor part I 600. The compressor part III 800 also receives the 1-bit signal indicating whether the compressed representation should be 128 bits in size, the 2-bit configuration identifier for the 128-bit mode and the 3-bit configuration identifier for the 256-bit mode from the compressor part II 700. The compressor part III 800 outputs two 128-bit words. In the 128-bit mode only the higher 128 bits are employed whereas in the 256-bit mode both the lower and higher 128 bits are employed as compressed representation of the pixel block.

Figure 16:
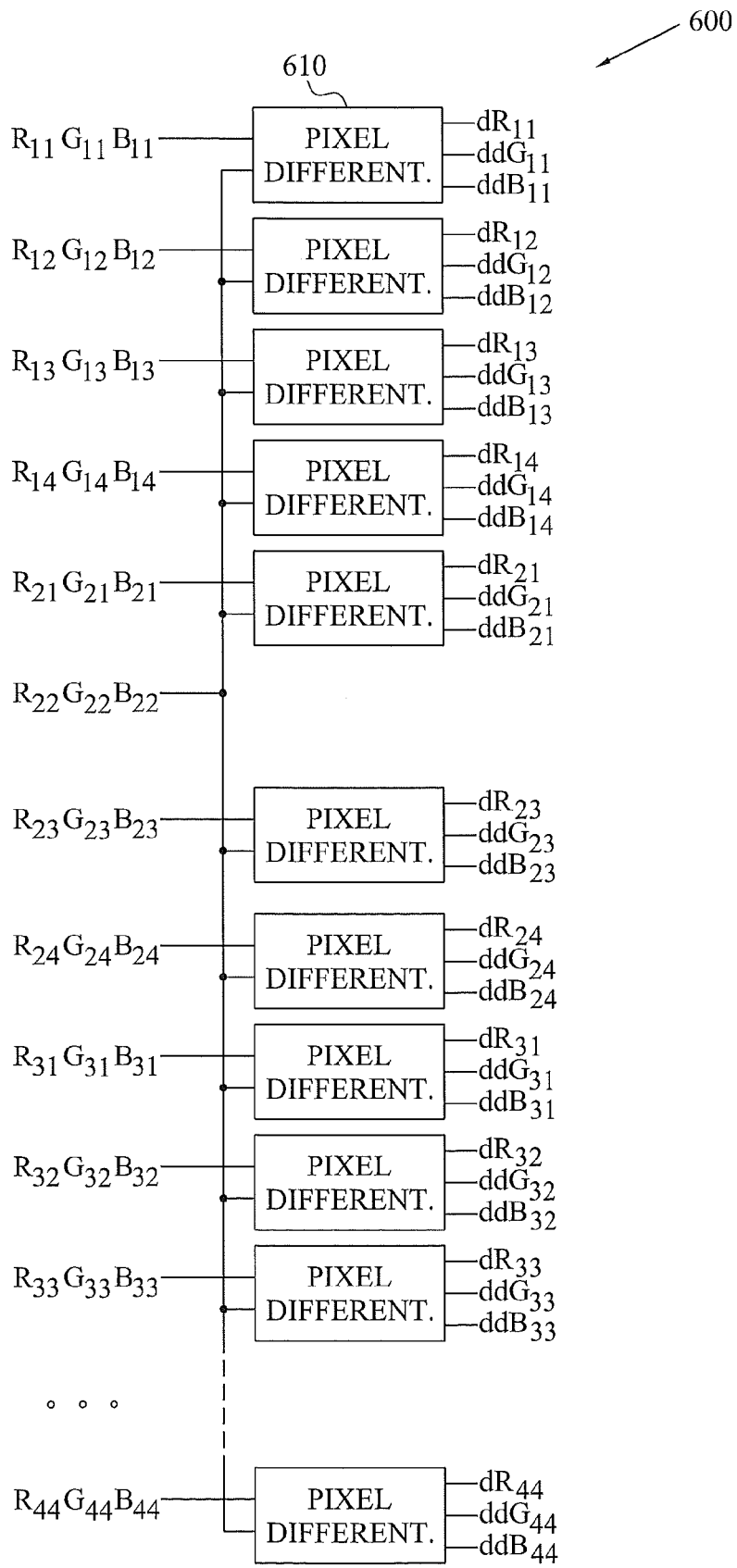
FIG. 16 illustrates a schematic hardware implementation of the compressor part I in FIG. 15 according to an embodiment.

FIG. 16 is a hardware implementation of the compressor part I 600 in FIG. 15 according to an embodiment. The compressor part I 600 comprises a set of pixel differentiators 610, preferably one such pixel differentiator 610 for each pixel in the pixel block except the defined starting pixel. Each pixel differentiator 610 receives the pixel value ($R_{ij}G_{ij}B_{ij}$) of a pixel and the pixel value ($R_{22}G_{22}B_{22}$) of the defined starting pixel. The pixel differentiator 610 outputs the prediction errors ($dR_{ij}$, $ddG_{ij}$, $ddB_{ij}$) calculated for the pixels.

Figure 17:
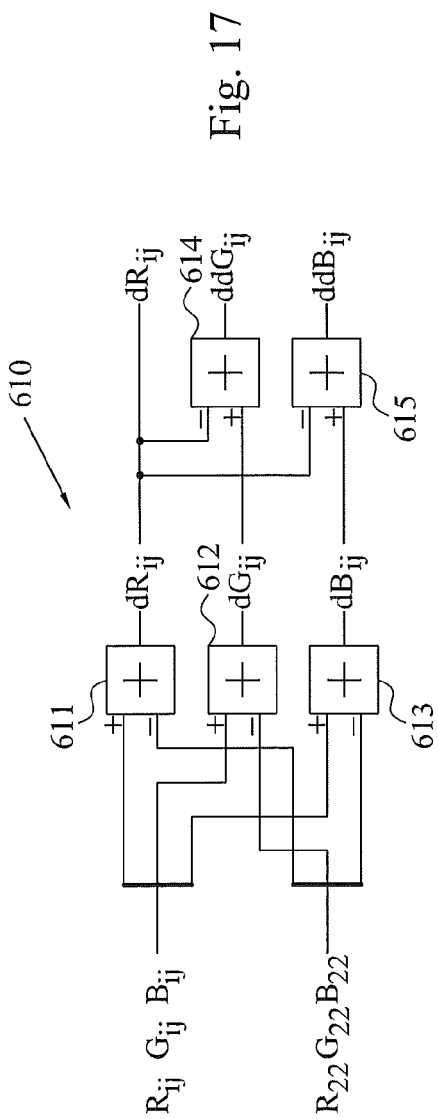
FIG. 17 illustrates a schematic hardware implementation of the pixel differentiators in FIG. 16 according to an embodiment.

FIG. 17 is a hardware implementation of a pixel differentiator 610 in FIG. 16 according to an embodiment. The pixel differentiator 610 comprises a first adder 611 that receives the eight bits of the red color component ($R_{ij}$) of the pixel and a negated version of the red color component ($R_{22}$) of the defined starting pixel and thereby outputs a 9-bit first or red prediction error ($dR_{ij}$). A second adder 612 and a third adder 613 correspondingly receives the eight bits of the green color component ($G_{ij}$) or the eight bits of the blue color component ($B_{ij}$) of the pixel and a negated version of the green ($G_{22}$) or blue ($B_{22}$) color components of the defined starting pixel. The 9-bit outputs $dG_{ij}$ and $dB_{ij}$ of the adders 612, 613 are input to a respective adder 614, 615, which additionally receives a negated version of the first or red prediction error. The respective adder output will be the 10-bit second or green prediction error ($ddG_{ij}$) and the third or blue prediction error ($ddB_{ij}$) of the pixel.

FIG. 18 is a hardware implementation of the compressor part II 700 in FIG. 15 according to an embodiment. The compressor part II 700 comprises three aggregates of pixel quantizer detectors 710. The first aggregate receives all the first prediction errors ($dR_{11}$-$dR_{44}$), the second aggregate receives the second prediction errors ($ddG_{11}$-$ddG_{44}$) and the third aggregate receives the third prediction errors ($ddB_{11}$-$ddB_{44}$) from the compressor part I. The 9-bit output from the first aggregate and the 10-bit outputs from the second and third aggregates are input to a works 128 bits circuitry 720 that investigates whether the 128-bit mode works and into a works 256 bits circuitry 730 that investigates whether the 256-bit mode works for the pixel block. The 4-bit output from the works 128 bits circuitry 720 is input to a circuitry for counting leading zeros 4 (CLZ4) 740 and the 8-bit output from the works 256 bits circuitry 730 is input to a circuitry for counting leading zeros 8 (CLZ8) 750. The two least significant bits of the 3-bit output from the CLZ4 circuitry 740 corresponds to the configuration identifier for the 128-bit mode. The most significant bit is input to a NOT gate 770 to output the signal whether the 128-bit mode can be used in which case the output signal is 1 bin. Correspondingly, the three least significant bits of the 4-bit output from the CLZ8 circuitry 750 is the configuration identifier for the 256-mode.

The most significant bits of the CLZ4 and CLZ8 circuitry 740, 750 are input to an OR gate 760 to output a signal that is set to $1_{bin}$ if the pixel block cannot be compressed according to the 128-mode or the 256-mode and should therefore be uncompressed. The most significant bit from the CLZ4 circuitry 740 and the negated version of the most significant bit from the CLZ8 circuitry 750 are input to an AND gate 780 that outputs $1_{bin}$ if the pixel block can be compressed according to the 256-mode and otherwise outputs $0_{bin}$.

Figure 19:
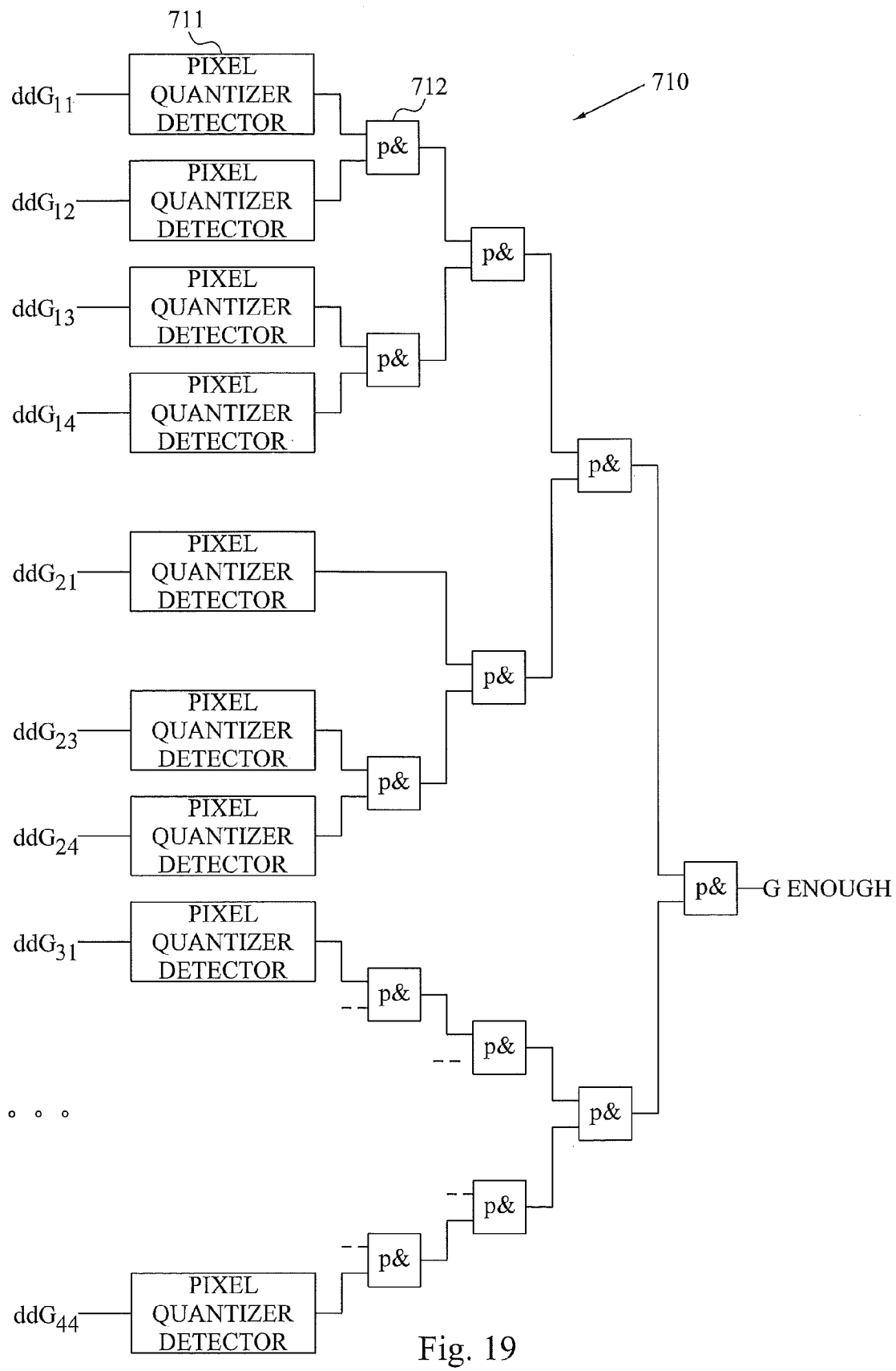
FIG. 19 illustrates a schematic hardware implementation of the aggregates of pixel quantizer detectors in FIG. 18 according to an embodiment.

FIG. 19 is a hardware implementation of an embodiment of one of the aggregates of pixel quantizer detectors 710 in FIG. 18, here represented by the aggregate that receives the second prediction errors. Each prediction error is input to a respective pixel quantizer detector 711 that outputs a 10-bit word defining the number of bits required to represent the particular prediction error. The outputs from the pixel quantizer detectors 711 are pairwise input to a pairwise AND circuitry (p&) 712. The exception is the prediction error $ddG_{21}$, which should be pairwise combined with the prediction error $ddG_{22}$, corresponding to the defined starting pixel. The output of the pixel quantizer detector for $ddG_{21}$ is therefore instead directly input to a pairwise AND circuitry of a second set. This means that a first set of 7 pairwise AND circuitry 712 receive the outputs from the 15 pixel quantizer detectors 711. A second set of 4 pairwise AND circuitries receive the outputs from the first set of pairwise AND circuitries. A third set of 2 pairwise AND circuitries receive the outputs from the second set of pairwise AND circuitries and the outputs of these two pairwise AND circuitries are input to a final pairwise AND circuitry that outputs a 10-bit word defining the minimum number of bits required for representing the second prediction errors.

Figure 20:
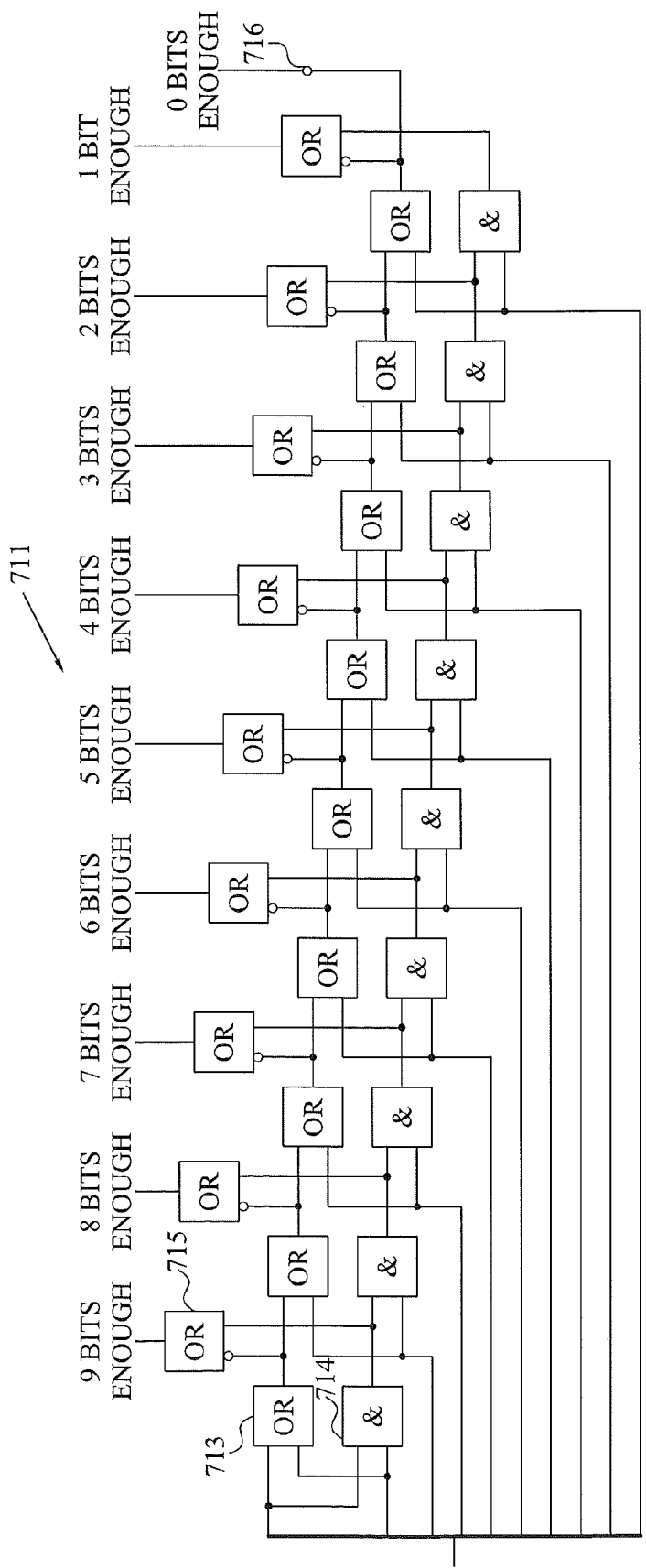
FIG. 20 illustrates a schematic hardware implementation of the pixel quantizer detectors in FIG. 19 according to an embodiment.

FIG. 20 is a hardware implementation of one of the pixel quantizer detectors 711 in FIG. 19 according to an embodiment. The pixel quantizer detector 711 comprises 9 sets of two OR gates 713, 715 and one AND gate 714. In general, the first OR gate of a given set receives the output from the first OR gate of the previous set and one of the bits of the 10-bit second prediction error. The AND gate of a given set receives the output of the AND gate of the previous set and the same bit of the 10-bit second prediction error as the first OR gate of the given set. The negated output of the first OR gate of a set and the output of the AND gate are input to the second OR gate of the set.

The first OR gate 713 and the AND gate 714 of the first set receives to the two most significant bits of the prediction error. These gates are connected to the second OR gate 715 of the first set.

Each set of gates 713-715, thus, generates an output bit that is equal to $1_{bin}$ if the prediction error can be represented by the number of bits associated with the particular set and is otherwise $0_{bin}$. Since the original red, green and blue color components are of 8 bits each, the prediction errors can always be presented by 10 bits. The first set of OR gates 713, 715 and AND gate 714 outputs $1_{bin}$ if the prediction error can be represented by 9 bits and otherwise $0_{bin}$ and so on down to the last set, where the output of the first OR gate of the last set is negated in a negation gate 716 to give $1_{bin}$ if zero bits are enough, i.e, the prediction error is 0, and otherwise outputs $0_{bin}$.

The output from the pixel quantizer detector 711 is a sequence of bits where the position of the least significant $1_{bin}$ indicates the number of bits required to represent the prediction error.

Figure 21:
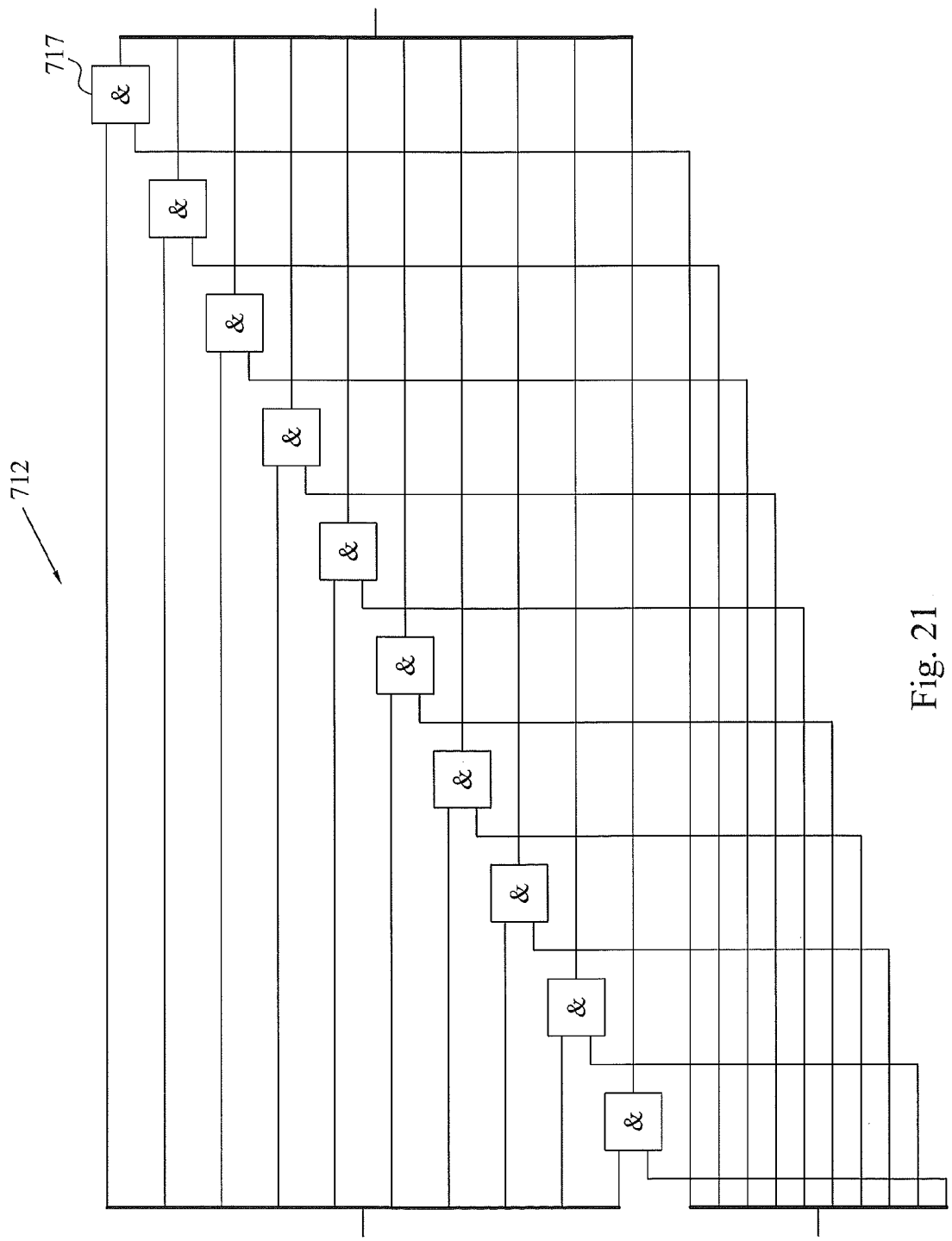
FIG. 21 illustrates a schematic hardware implementation of the pairwise AND-circuitries in FIG. 19 according to an embodiment.

FIG. 21 is a hardware implementation of the pairwise AND gates 712 in FIG. 19 according to an embodiment. The pairwise AND circuitry 712 comprises ten AND gates 717 connected to receive a respective bit from each of the two 10-bit input words, The first AND gate 717 thereby receives the most significant bits of the input words, the second AND gate receives the second most significant bits and so on down to the tenth AND gate that receives the least significant bits of the input words.

Figure 22:
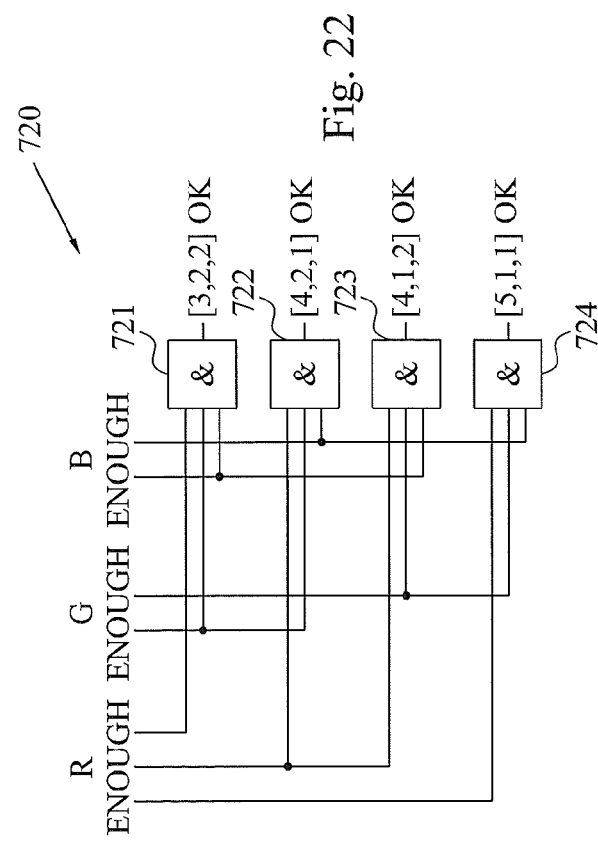
FIG. 22 illustrates a schematic hardware implementation of the works 128 bits circuitry in FIG. 18 according to an embodiment.

FIG. 22 is a hardware implementation of an embodiment of the works 128 bits circuitry 720 in FIG. 18. The works 128 bits circuitry 720 comprises a first AND gate 721 that receives the third least significant bit (2 bits enough, see FIG. 20) of the output from the aggregate of pixel quantizer detectors for the blue channel, the third least significant bit (2 bits enough) of the output from the aggregate of pixel quantizer detectors for the green channel and the fourth least significant bit (3 bits enough) of the output from the aggregate of pixel quantizer detectors for the red channel. If these inputs are all $1_{bin}$ the first AND gate outputs $1_{bin}$ to indicate that the symbol configuration [3, 2, 2] works for the current pixel block. If the output from the first AND gate 721 is $0_{bin}$ the symbol configuration [3, 2, 2] cannot be used for the pixel block since at least one of the first prediction errors require more than 3 bits, at least one of the second prediction errors require more than 2 bit and/or at least one of the third prediction errors require more than 2 bits.

A second AND gate 722 of the works 128 bits circuitry 720 receives the second least significant bit (1 bit enough) of the aggregate of pixel quantizer detectors for the blue channel, the third least significant bit (2 bits enough) of the output from the aggregate of pixel quantizer detectors for the green channel and the fifth least significant bit (4 bits enough) of the output from the aggregate of pixel quantizer detectors for the red channel. If these inputs are all $1_{bin}$ the second AND gate 722 outputs $1_{bin}$ to indicate that the symbol configuration [4, 2, 1] works for the current pixel block otherwise the output is $0_{bin}$.

A third AND gate 723 of the works 128 bits circuitry 720 receives the third least significant bit (2 bits enough) of the aggregate of pixel quantizer detectors for the blue channel, the second least significant bit (1 bits enough) of the output from the aggregate of pixel quantizer detectors for the green channel and the fifth least significant bit (4 bits enough) of the output from the aggregate of pixel quantizer detectors for the red channel. If these inputs are all $1_{bin}$ the third AND gate 723 outputs $1_{bin}$ to indicate that the symbol configuration [4, 1, 2] works for the current pixel block otherwise the output is $0_{bin}$.

Finally, a fourth AND gate 724 of the works 128 bits circuitry 720 receives the second least significant bit (1 bit enough) of the aggregate of pixel quantizer detectors for the blue channel, the second least significant bit (1 bits enough) of the output from the aggregate of pixel quantizer detectors for the green channel and the sixth least significant bit (5 bits enough) of the output from the aggregate of pixel quantizer detectors for the red channel. If these inputs are all $1_{bin}$ the fourth AND gate 724 outputs $1_{bin}$ to indicate that the symbol configuration [5, 1, 1] works for the current pixel block otherwise the output is $0_{bin}$.

Figures 23, 24:
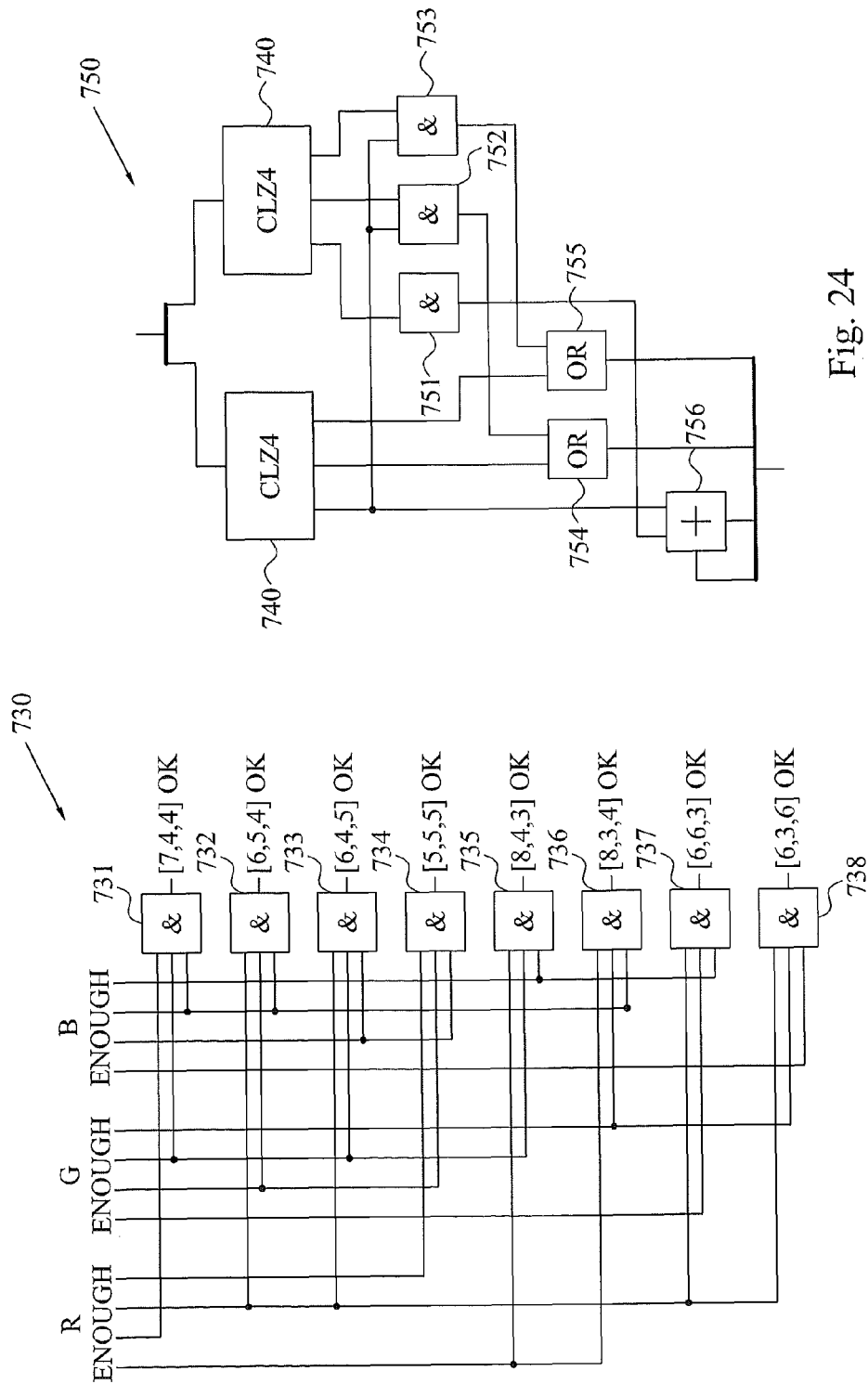
FIG. 23 illustrates a schematic hardware implementation of the works 256 bits circuitry in FIG. 18 according to an embodiment.
FIG. 24 illustrates a schematic hardware implementation of the circuitry for counting leading zeros 8 (CLZ8) in FIG. 18 according to an embodiment.

FIG. 23 is a corresponding hardware implementation embodiment of the works 256 bits circuitry 730 in FIG. 18. This works 256 bits circuitry 730 comprises eight AND gates 731-738 that receive bits of the outputs from the aggregates of pixel quantizer detectors for the red, green and blue channels. The first AND gate 731 investigates whether the symbol configuration [7, 4, 4] works, the second AND gate 732 instead investigates whether the symbol configuration [6, 5, 4] works. The remaining AND gates 733-738 each investigates one of the remaining symbol configurations [6, 4, 5], [5, 5, 5], [8, 4, 3], [8, 3, 4], [6, 6, 3] and [6, 3, 6].

FIG. 24 is a hardware implementation of an embodiment of the CLZ8 circuitry 750 in FIG. 18. The CLZ8 circuitry 750 comprises a two CLZ4 circuitries 740, of which a first CLZ4 circuitry 740 receives the four most significant bits of the 8-bit input sequence and a second CLZ4 circuitry 740 receives the four least significant bits. The three output bits from the second CLZ4 circuitry 740 are each input to a respective AND gate 751-753. The other inputs to these AND gates 751-753 is the most significant bit of the 3-bit output from the first CLZ4 circuitry 740. The output from the second AND gate 752 is input to a first OR gate 754 that also receives the second most significant bit of the output from the first CLZ4 circuitry 740. A second OR gate 755 receives the least significant bit of the output from the first CLZ4 circuitry 740 and the output from the third AND gate 753. The output from the first AND gate 751 is added to the most significant bit of the first CLZ4 circuitry 740 in an adder 756. The carry out bit from the adder 756 constitutes the most significant bit of the 4-bit output from the CLZ8 circuitry 750 where the remaining bits constitute the output from the adder 756 followed by the outputs from the first OR gate 754 and finally the second OR gate 755.

Figure 25:
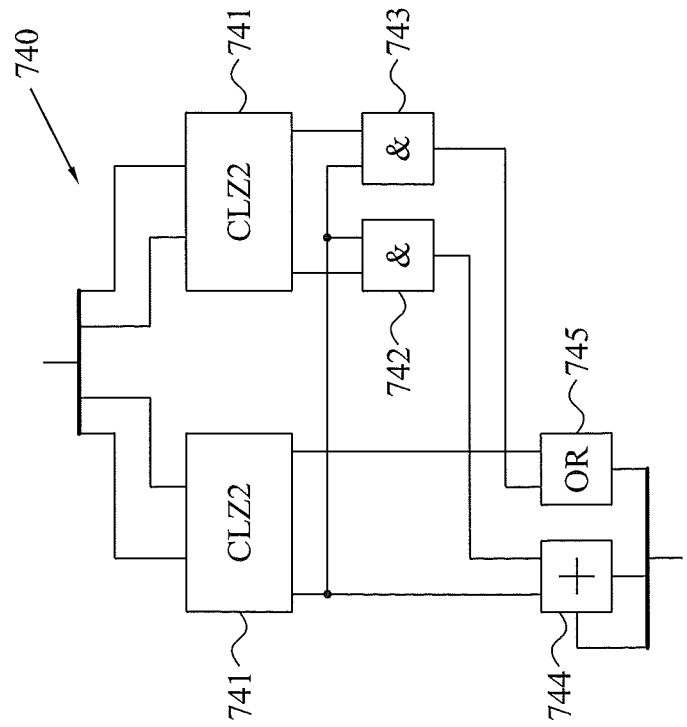
FIG. 25 illustrates a schematic hardware implementation of the circuitry for counting leading zeros 4 (CLZ4) in FIGS. 18 and 24 according to an embodiment.

FIG. 25 is a hardware implementation of an embodiment of the CLZ4 circuitry 740 in FIGS. 18 and 24. The two most significant bits of the 4-bit input sequence are input to a first circuitry for counting leading zeros 2 (CLZ2) 741, whereas the two least significant bits are input to a second CLZ2 circuitry 741. The two outputs from the second CLZ2 circuitry 741 are input to a respective AND gate 742, 743, which also receive the most significant bit from first CLZ2 circuitry 741. The output from the first AND gate 742 is input together with the most significant bit from the first CLZ2 circuitry 741 to an adder 744. The output from the second AND gate 743 is input together with the least significant bit from the first CLZ2 circuitry 741 to an OR gate 745. The carry out bit from the adder 744 will be the most significant bit of the 3-bit output followed by the output from the adder 744 and the output from the OR gate 745.

Figure 26:
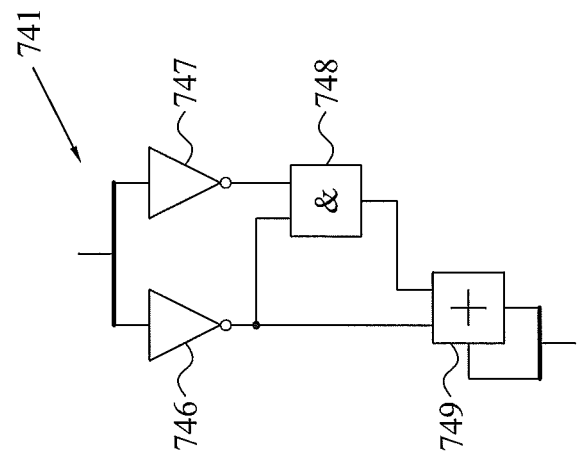
FIG. 26 illustrates a schematic hardware implementation of the circuitry for counting leading zeros 2 (CLZ2) in FIG. 25 according to an embodiment.

FIG. 26 is a hardware implementation of an embodiment of the CLZ2 circuitry 741 in FIG. 25. The most significant bit of the 2-bit input enters a first NOT gate 746 and the least significant bit enters a second NOT gate 747. The outputs from the two NOT gates 746, 748 are input to an AND gate 748. The AND gate output is brought to an adder 749 together with the output from the first NOT gate 746. The carry out bit from the adder 749 will be the most significant bit of the output and the least significant bit is the adder output.

Figure 27:
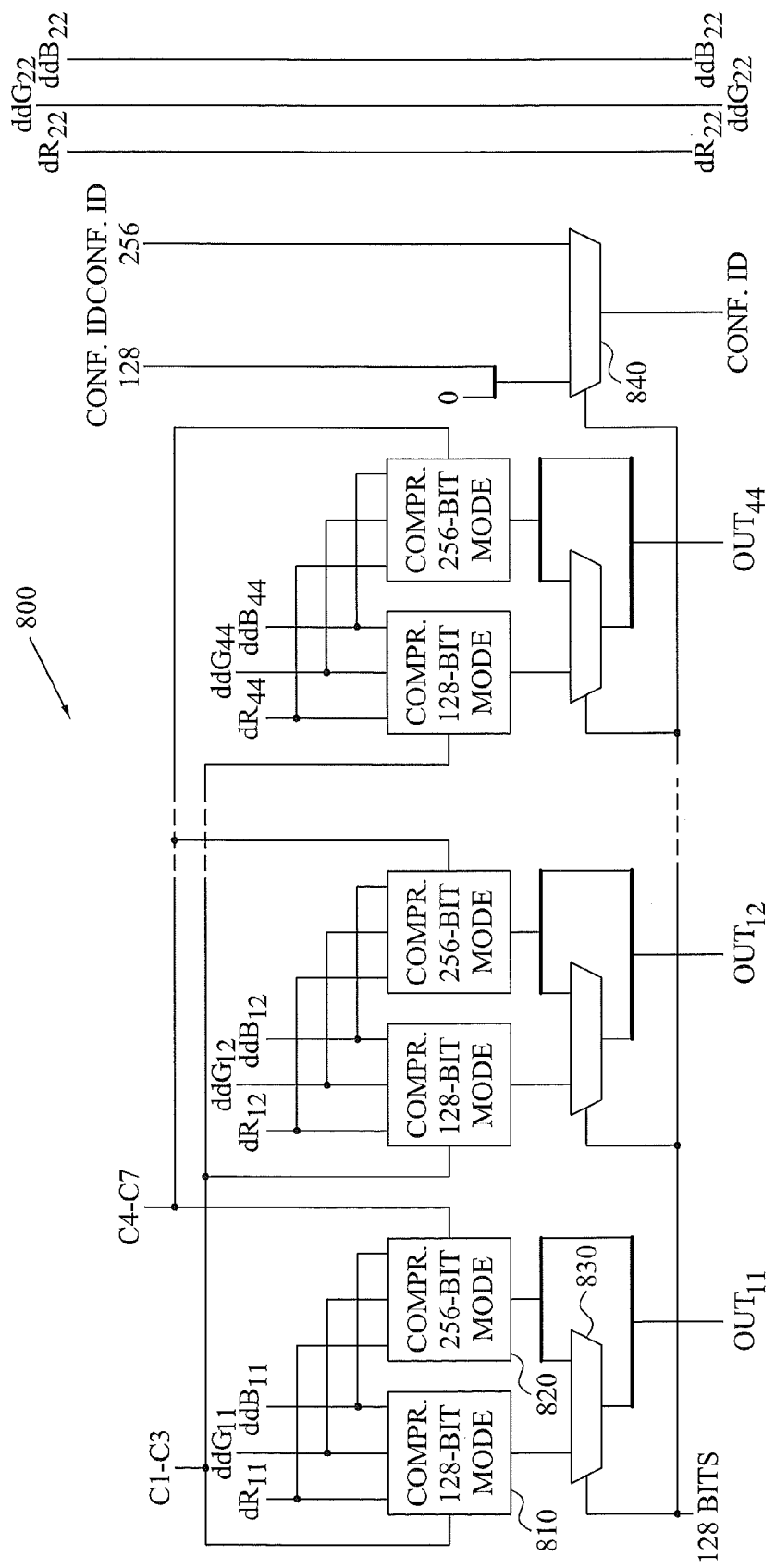
FIG. 27 illustrates a schematic hardware implementation of the compressor part III in FIG. 15 according to an embodiment.

FIG. 27 is a hardware implementation of an embodiment of the compressor part III 800 in FIG. 15. The compressor part III 800 comprises a set of a compressor for 128-bit mode 810, a compressor for 256-bit mode and a multiplexor 830 for each pixel in the pixel block except the defined starting pixel. The compressor for 128-bit mode 810 receives the prediction errors calculated for the pixel by the compressor part I and the control signals C1-03 from the control logic. The compressor for 256-bit mode 820 also receives the prediction errors but the control signals C4-C7. The multiplexor 830 selects between the 7-bit output from the compressor for 128-bit mode 810 and the seven most significant bits from the 15 bit output from the compressor for 256-bit mode 820. The selection of which bits to output is dictated by the 1-bit 128 bits signal. If this bit is $1_{bin}$ the seven bits from the compressor for 256-bit mode 820 is selected otherwise the seven bits from the compressor for 128-bit mode 810. The selected seven bits and the eight least significant bits from the compressor for 256-bit mode 820 forms the 15-bit output for the particular pixel.

The compressor part III 800 also comprises a multiplexor 840 that selects between the configuration identifier for the 128-bit mode and the configuration identifier for the 256-bit mode based on the value of the 1-bit 128 bits signal. The configuration identifier for the 128-bit mode input to the compressor part III 800 is a 2-bit signal but is converted to a 3-bit signal by adding $0_{bin}$ as the most significant bit of the configuration identifier for the 128-bit mode before it is input to the multiplexor 840. The multiplexor 840 therefore outputs a 3-bit configuration identifier selected for the present pixel block.

The lower 128 bits output from the compressor part III 800, see FIG. 15, comprises (in order from most significant bit to least significant bit) the two least significant bit of the configuration identifier from the multiplexor 840, the 3×8 bits of the RGB value for the defined starting pixel, i.e. $R_{22}, G_{22}, B_{22}$, followed by the seven or six most significant bits of the respective 15-bit outputs $OUT_{11}$ to $OUT_{44}$. Six most significant bits are used for $OUT_{21}, OUT_{23}$ and $OUT_{32}$, whereas the seven most significant bits are used for the other 15-bit outputs.

The higher 128 bits output from the compressor part III 800, see FIG. 15, comprises (in order from most significant bit to least significant bit) the most significant bit of the configuration identifier from the multiplexor 840 followed by the eight or nine least significant bits of the respective 15-bit outputs $OUT_{11}$ to $OUT_{44}$. Nine most significant bits are used for $OUT_{21}, OUT_{23}$ and $OUT_{32}$, whereas the eight most significant bits are used for the other 15-bit outputs.

Figure 28:
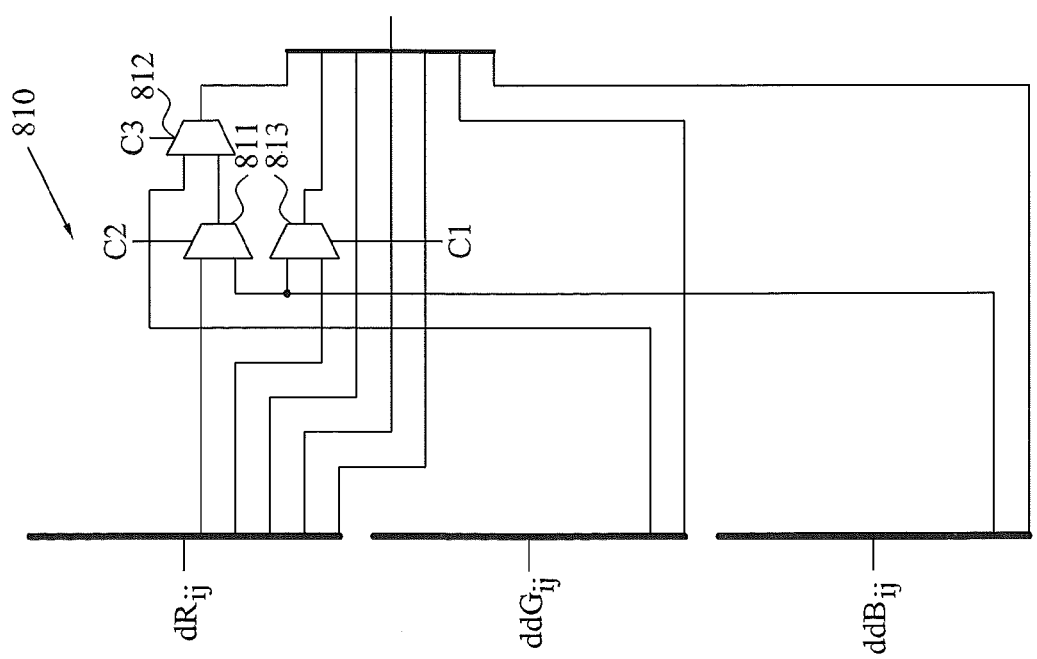
FIG. 28 illustrates a schematic hardware implementation of the compressor for 128-bit mode in FIG. 27.

FIG. 28 is a hardware implementation of an embodiment of the compressor for 128-bit mode 810 in FIG. 27. The fifth least significant bit of the first prediction error is input to a first multiplexor 811 together with the second least significant bit of the third prediction error. The multiplexor 811 outputs one of these bits based on the control signal C2. The multiplexor output is input to a second multiplexor 812 that also receives the second least significant bit of the second prediction error. The control signal C3 determines which of the input bits to output. This output bit constitutes the most significant bit of the 7-bit output word. A third multiplexor 813 receives the fourth least significant bit of the first prediction error and the second least significant bit of the third prediction error. The multiplexor 813 outputs one of these bits based on the control signal C1. The output constitutes the second most significant bit of the 7-bit output word. The following three bits in the 7-bit output word are the three least significant bits of the first prediction error. The second least significant bit of the 7-bit output word is the least significant bit of the second prediction error and the least significant bit of the 7-bit output word is the least significant bit of the third prediction error.

Figure 29:
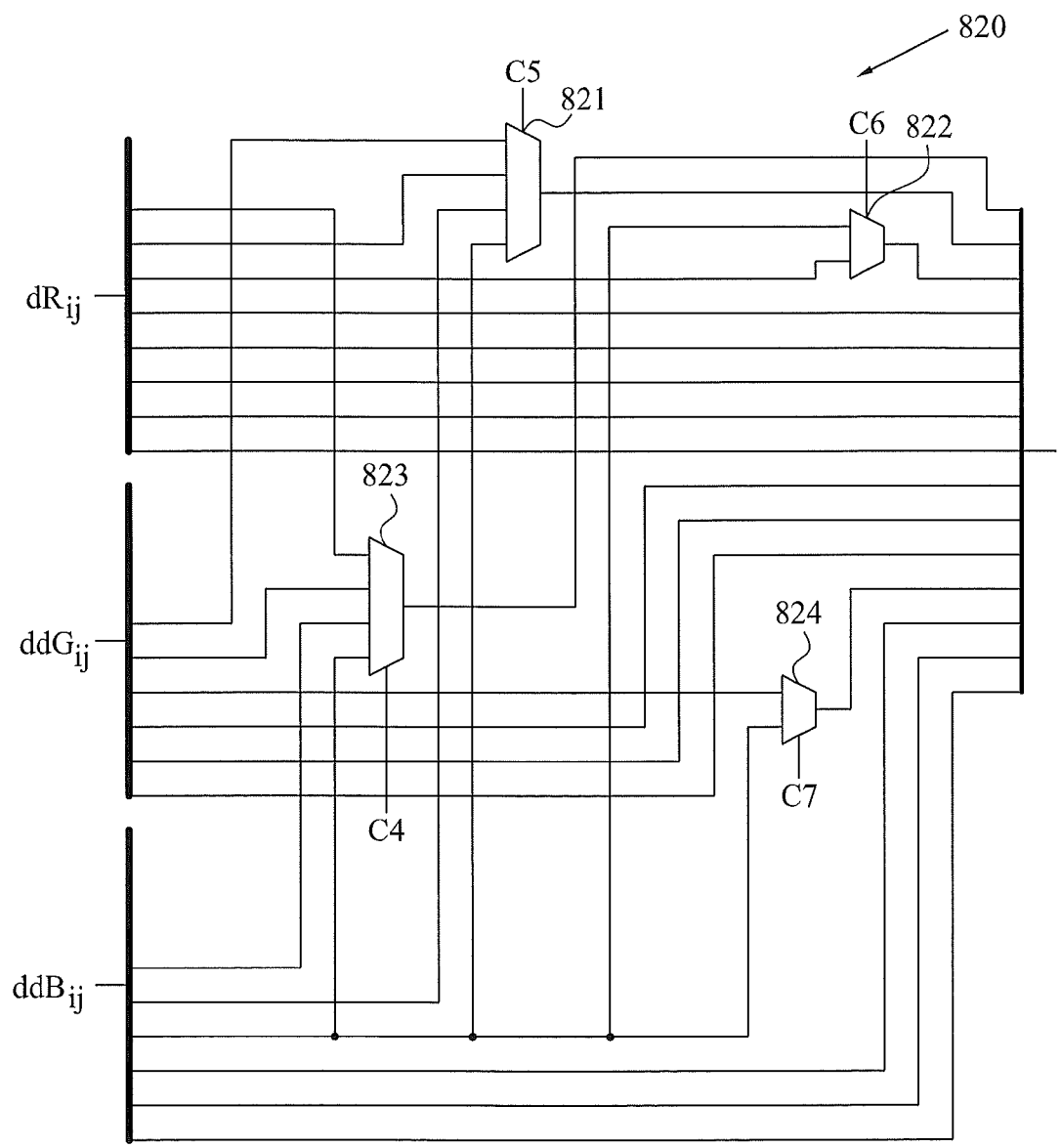
FIG. 29 illustrates a schematic hardware implementation of the compressor for 256-bit mode in FIG. 27.

FIG. 29 is a hardware implementation of an embodiment of the compressor for 256-bit mode 820 in FIG. 27. A first multiplexor 821 receives the fifth most significant bit of the second prediction error, the fourth most significant bit of the first prediction error and the fourth and fifth least significant bits of the third prediction error. The first multiplexor 821 outputs one of these bits based on the control signal C5. A second multiplexor 823 receives the third most significant bit of the first prediction error, the fifth least significant bit of the second prediction error and the fifth most significant bit and the fourth least significant bit of the third prediction error. The second multiplexor 823 outputs one of these bits based on the control signal C4.

A third multiplexor 822 receives the fifth most significant bit of the first prediction error and the fourth least significant bit of the third prediction error. The third multiplexor 822 outputs one of these bits based on the control signal C6. Finally, a fourth multiplexor 824 receives the fourth least significant bit of the second prediction error and the fourth least significant bit of the third prediction error and outputs one of these two bits based on the control signal C7. The 15-bit output word consist of the following bits in order from most significant bit to the least significant bit: the output from the second multiplexor 823, the output from the first multiplexor 821, the output from the third multiplexor 822, the fifth least significant bit to the least significant bit of the first prediction error, the third least significant bit to the least significant bit of the second prediction error, the output from the fourth multiplexor 824 and the third least significant bit to the least significant bit of the third prediction error.

Figure 30:
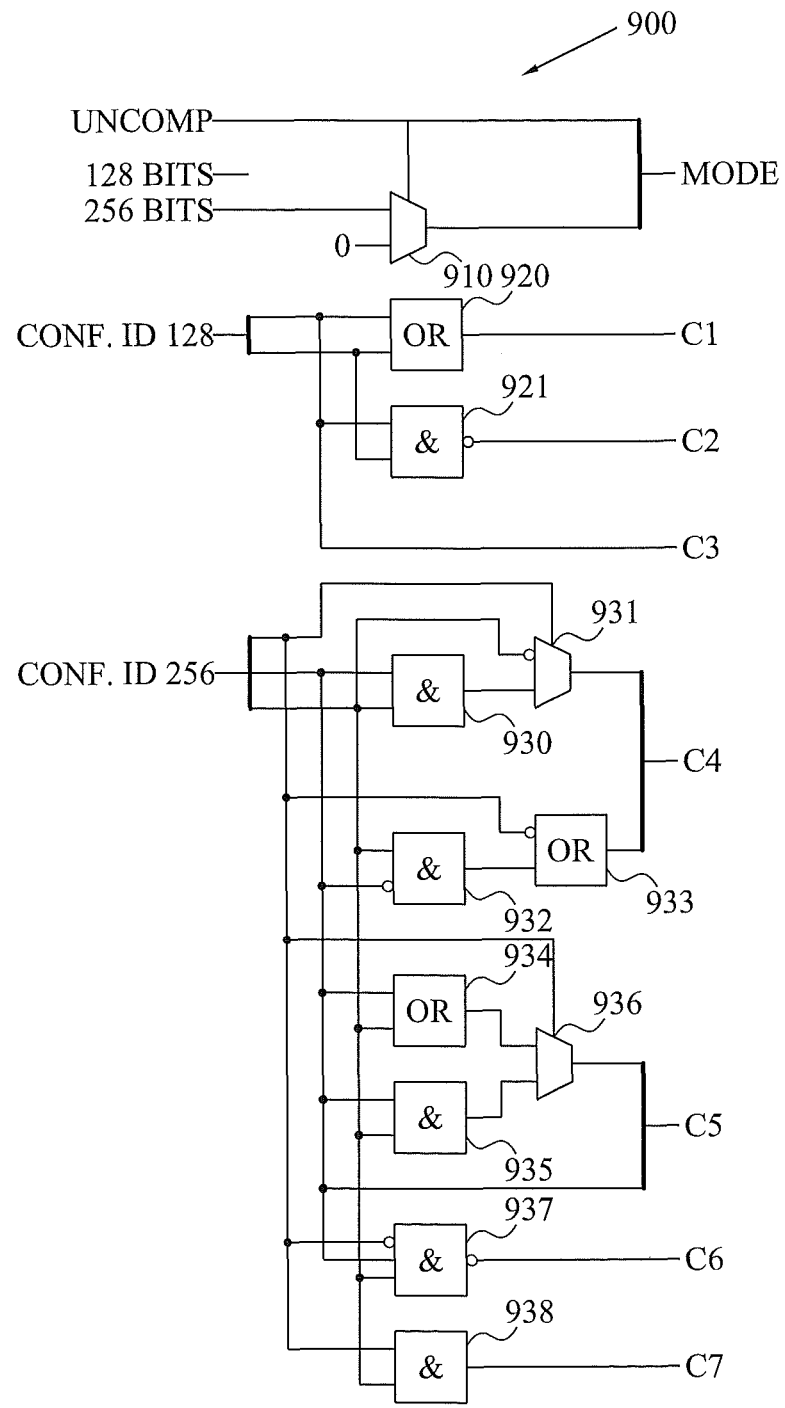
FIG. 30 illustrates a schematic hardware implementation of the control logic in FIG. 15 according to an embodiment.

FIG. 30 is a hardware implementation of an embodiment of the control logic 900 in FIG. 15. The control logic 900 comprises a first multiplexor 910 that selects between $0_{bin}$ and the 1-bit signal indicating whether the 256-bit mode can be used. The selection of which input bit to output is made based on the 1-bit signal indicating whether the pixel block is uncompressed. This 1-bit constitutes the most significant bit of the 2-bit mode signal, whereas the multiplexor output is the least significant bit. The 2-bit mode signal indicates which compression mode that has been selected for the current pixel block, such as uncompressed, 128-bit mode, 256-bit mode or optionally fast color clear. In a particular embodiment as illustrated in FIG. 30, $00_{bin}$ indicates 128-bit mode, $01_{bin}$ signal 256-bit mode, $10_{bin}$ indicates uncompressed and $11_{bin}$ is not used or can optionally be used to signal fast color clear. Traditionally these mode bits are stored separately from the compressed representation of the pixel block and typically in another memory than the color buffer. The bits could, though, be attached to and stored in connection with the compressed representation of the pixel block.

The control signal C1 is formed by the output from an OR gate 920 receiving the two bits of the configuration identifier for the 128-bit mode as input. The second control signal C2 is the output from an AND gate 921 with negated output and receiving the two bits from the configuration identifier for the 128-bit mode. The control signal C3 is equal to the most significant bit of the configuration identifier for the 128-bit mode.

The control signal C7 is the output from an AND gate 938 receiving the most and least significant bits of the 3-bit configuration identifier for the 256-mode. The control signal C6 is the negated output from an AND gate 937 receiving the negated version of the most significant bit and the two least significant bits of the configuration identifier for the 256-bit mode.

The two least significant bits of the configuration identifier for the 256-mode are also input to an OR gate 934 and an AND gate 935. The outputs from these two gates 934, 935 are connected to the inputs of a multiplexor 936 that outputs one of input signals based on the value of the most significant bit of the configuration identifier for the 256-bit mode. The multiplexor output constitutes the most significant bit of the 2-bit control signal C5 with the second least significant bit of the configuration identifier for the 256-bit mode as the least significant bit.

An AND gate 930 also receives the two least significant bit of the configuration identifier for the 256-bit mode. The output from the AND gate 930 is input to together with a negated version of the least significant bit of the configuration identifier for the 256-bit mode to a multiplexor 931 that outputs one of the bits as the most significant bit of the 2-bit control signal C4 based on the value of the most significant bit of the configuration identifier for the 256-bit mode.

Another AND gate 932 receives a negated version of the second least significant bit of the configuration identifier for the 256-bit mode and the least significant bit of the configuration identifier for the 256-bit mode. The output is input to an OR gate 933 as is a negated version of the most significant bit of the configuration identifier for the 256-bit mode. The output from the OR gate 933 constitutes the least significant bit of the control signal C4.

The above described hardware implementations illustrated in FIGS. 15-30 should merely be seen as illustrative examples of hardware circuitry that can be used to implement the compressing device. Other hardware circuitries that can achieve similar functions can be used instead and are within the scope of the embodiments.

Decompressing Device

Figure 31:
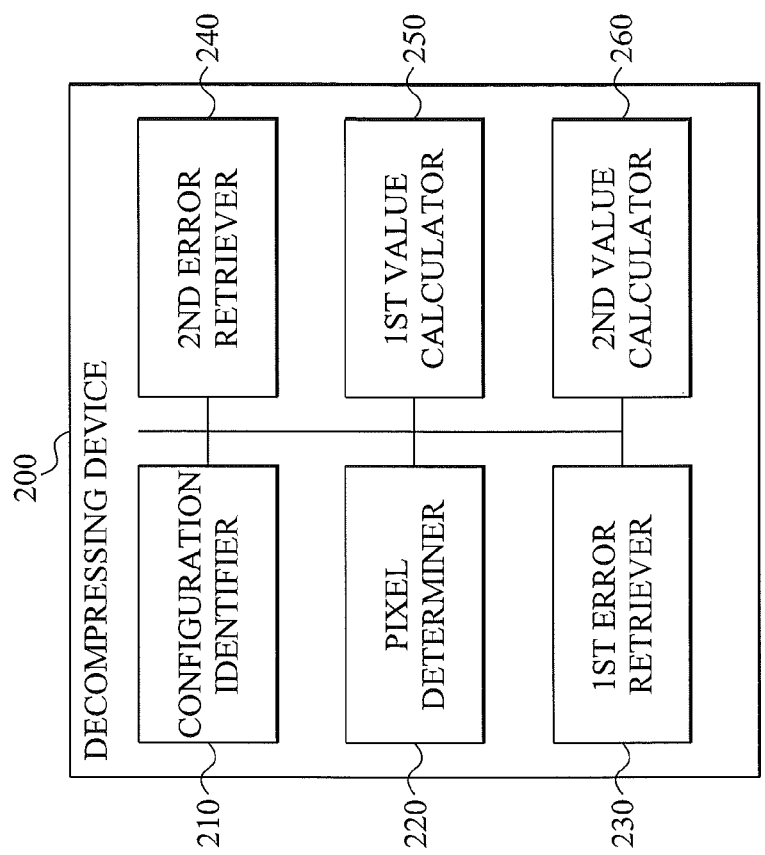
FIG. 31 is a schematic block diagram of a decompressing device according to an embodiment.

FIG. 31 is a schematic block diagram of an embodiment of a decompressing device 200 according to an embodiment. The decompressing device 200 comprises a configuration identifier 210 configured to identify a symbol configuration for the pixel block based on a configuration identifier comprised in the compressed representation. The identified symbol configuration defines a first number of symbols maximally available for first prediction errors, a second number of symbols maximally available for second prediction errors and optionally a third number of symbols available for third prediction errors.

A pixel determiner 220 is configured to determine first, second and optionally third pixel value components of a defined starting pixel in the pixel block based on a representation comprised in the compressed representation. In a particular embodiment, the pixel determiner 220 simply retrieves the first, second and optionally third pixel value components from the sequence of symbols representing the compressed representation of the pixel block.

A first error retriever 230 is implemented to retrieve a respective first representation of a first prediction error for each pixel in the pixel block except the defined starting pixel from the compressed representation. In order to identify the relevant part of the compressed representation where the first representation is positioned, the first error retriever 230 uses the first number of symbols defined by the symbol configuration identified by the configuration identifier 210 and preferably also the position of the relevant pixel in the pixel block.

A second error retriever 240 is configured to retrieve, for each pixel except the defined starting pixel, a second and optionally a third representation of the second prediction error and optionally the third prediction error, respectively, for the pixel. In such a case, the second error retriever 240 uses the second number of symbols and optionally the third number of symbols of the defined symbol configuration and preferably also the position of the pixel in the pixel block to identify the second representation and optionally the third representation, respectively in the compressed representation of the pixel block.

The decompressing device 200 comprises a first value calculator 250 configured to calculate a first pixel value for each pixel except the defined starting pixel based on the first representation of the first prediction error of the pixel and a first pixel value component of a prediction pixel assigned to the pixel. A second value calculator 260 is configured to calculate a second pixel value component and optionally a third pixel value component of the pixel based on the second representation of the second prediction error of the pixel, a second pixel value component of the prediction pixel and the first prediction error of the pixel and optionally based on the third representation of the third prediction error of the pixel, a third pixel value component of the prediction pixel and the first prediction error of the pixel.

The units 210-260 of the decompressing device 200 may be implemented or provided as hardware or a combination of hardware and software. In the case of a software-based implementation, a computer program product implementing the decompressing device 200 or a part thereof comprises software or a computer program run on a general purpose or specially adapted computer, processor or microprocessor. The software includes computer program code elements or software code portions illustrated in FIG. 31. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server.

The units 210-260 of the decompressing device 200 are preferably implemented in a display device as illustrated in FIG. 12. In such a case, the units 210-260 are advantageously implemented in hardware.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of compressing a pixel block comprising multiple pixels each having a respective pixel value comprising at least a first pixel value component and a second pixel value component, said method comprising:

calculating, for each pixel of said multiple pixels except a defined starting pixel in said pixel block, a first prediction error based on a first pixel value component of said pixel and a first pixel value component of a respective prediction pixel;

calculating, for each pixel of said multiple pixels except said defined starting pixel, a second prediction error based on said first pixel value component and a second pixel value component of said pixel and said first pixel value component and a second pixel value component of said respective prediction pixel;

determining a first minimum number of symbols required for representing said first prediction errors calculated for each pixel of said multiple pixels except said defined starting pixel;

determining a second minimum number of symbols required for representing said second prediction errors calculated for each pixel of said multiple pixels except said defined starting pixel;

selecting, among a set of multiple different symbol configurations, a symbol configuration based on said first minimum number of symbols and said second minimum number of symbols, each symbol configuration of said set defines a respective first number of symbols maximally available for said first prediction errors and a respective second number of symbols maximally available for said second prediction errors; and storing, in a memory, a compressed representation of said pixel block comprising a configuration identifier of said selected symbol configuration, a representation of a pixel value of said defined starting pixel and, for each pixel of said multiple pixels except said defined starting pixel, a first representation of said first prediction error and a second representation of said second prediction error, said first representations have maximally a same number of symbols as said first number of symbols of said selected symbol configuration and said second representations have maximally a same number of symbols as said second number of symbols of said selected symbol configuration.

2. The method according to claim 1, wherein
calculating said first prediction error comprises calculating, for each pixel of said multiple pixels except said defined starting pixel, said first prediction error based on said first pixel value component of said pixel and a first pixel value component of said defined starting pixel; and
calculating said second prediction error comprises calculating, for each pixel of said multiple pixels except said defined starting pixel, said second prediction error based on said first pixel value component and said second pixel value component of said pixel and said first pixel value component and a second pixel value component of said defined starting pixel.

3. The method according to claim 2, further comprising:
calculating, for each pixel of said multiple pixels except said defined starting pixel, a maximum value based on a sum of said second pixel value component of said defined starting pixel, said first prediction error calculated for said pixel and a largest value representable by said second number of symbols available for said second prediction errors according to said selected symbol configuration;
calculating, for each pixel of said multiple pixels except said defined starting pixel, a minimum value based on a sum of said second pixel value component of said defined starting pixel, said first prediction error calculated for said pixel and a smallest value representable by said second number of symbols available for said second prediction errors according to said selected symbol configuration;

comparing, for each pixel of said multiple pixels except said defined starting pixel, said maximum value with a maximum threshold; and comparing, for each pixel of said multiple pixels except said defined starting pixel, said minimum value with a minimum threshold, wherein calculating said second prediction error comprises:

recalculating, for each pixel of said multiple pixels for which said maximum value exceeds said maximum threshold, said second prediction error based on a difference between said second pixel value component of said pixel and a difference between said maximum threshold and said largest value representable by said second number of symbols available for said second prediction errors according to said selected symbol configuration; and recalculating, for each pixel of said multiple pixels for which said minimum value is below said minimum threshold, said second prediction error based on a difference between said second pixel value component of said pixel and a difference between said minimum threshold and said smallest value representable by said second number of symbols available for said second prediction errors according to said selected symbol configuration.

4. The method according to claim 1, wherein
calculating said first prediction error comprises calculating, for each pixel of said multiple pixels except said defined starting pixel, said first prediction error based on said first pixel value component of said pixel and a first pixel value component of a respective neighboring pixel in said pixel block; and
calculating said second prediction error comprises calculating, for each pixel of said multiple pixels except said defined starting pixel, said second prediction error based on said first pixel value component and said second pixel value component of said pixel and said first pixel value component and a second pixel value component of said respective neighboring pixel.

5. The method according to claim 1, further comprising calculating a multiplication factor as a quotient between a difference between a second pixel value component of a first pixel in said pixel block and a second pixel value component of a second pixel in said pixel block and a difference between a first pixel value component of said first pixel and a first pixel value component of said second pixel, wherein calculating said second prediction error comprises calculating, for each pixel of said multiple pixels except said defined starting pixel, said second prediction error based on a difference between said second pixel value component of said pixel and said second pixel value component of said respective prediction pixel and said first prediction error multiplied by said multiplication factor.

6. The method according to claim 1, further comprising selecting one pixel of at least a subset of said multiple pixels in said pixel block as said defined starting pixel based on a pixel value of said one pixel, wherein storing said compressed representation comprises storing, in said memory, said compressed representation comprising said configuration identifier, said representation of said pixel value of said defined starting pixel, a pixel identifier of said one pixel and, for each pixel of said multiple pixels except said defined starting pixel, said first representation of said first prediction error and said second representation of said second prediction error.

7. The method according to claim 6, further comprising:
identifying a largest pixel value of said multiple pixels in said pixel block; and
identifying a smallest pixel value of said multiple pixels in said pixel block, wherein selecting said one pixel comprises selecting said one pixel as a pixel of said at least a subset of said multiple pixels in said pixel block having a pixel value that is closest to an average of said largest pixel value and said smallest pixel value.

8. The method according to claim 1, wherein said respective pixel values comprise a red color component, a green color component and a blue color component,
calculating said first prediction error comprises:
calculating, for each pixel of said multiple pixels except said defined starting pixel, a first candidate of said first prediction error based on a red color component of said pixel and a red color component of said respective prediction pixel; and
calculating, for each pixel of said multiple pixels except said defined starting pixel, a second candidate of said first prediction error based on a green color component of said pixel and a green color component of said respective prediction pixel; and
calculating said second prediction error comprises:
calculating, for each pixel of said multiple pixels except said defined starting pixel, a first candidate of said second prediction error based on a green color component of said pixel, a green color component of said respective prediction pixel and said first candidate of said first prediction error; and
calculating, for each pixel of said multiple pixels except said defined starting pixel, a second candidate of said second prediction error based on a red color component of said pixel, a red color component of said respective prediction pixel and said second candidate of said first prediction error, said method further comprising:
calculating, for each pixel of said multiple pixels except said defined starting pixel, a first candidate of a third prediction error based on a blue color component of said pixel, a blue color component of said respective prediction pixel and said first candidate of said first prediction error;
calculating, for each pixel of said multiple pixels except said defined starting pixel, a second candidate of said third prediction error based on said blue color component of said pixel, said blue color component of said respective prediction pixel and said second candidate of said first prediction error;
determining a third minimum number of symbols required for representing said third prediction errors calculated for each pixel of said multiple pixels except said defined starting pixel; and
selecting said first pixel value components as one of said red color components and said green color components and selecting said second pixel value components as the other of said red color components and said green color components based on said first candidates of said first prediction error, said first candidates of said second prediction error, said first candidates of said third prediction errors, said second candidates of said first prediction error, said second candidates of said second prediction error and said second candidates of said third prediction error, wherein
selecting said symbol configuration comprises selecting, among said set of multiple different symbol configurations, said symbol configuration based on said first minimum number of symbols, said second minimum number of symbols and said third minimum number of symbols; and
storing said compressed representation comprises storing, in said memory, said compressed representation comprising said configuration identifier, said representation of said pixel value of said defined starting pixel, a color identifier defining whether said first pixel value components are red color components or green color components and, for each pixel of said multiple pixels except said defined starting pixel, said first representation of said first prediction error, said second representation of said second prediction error and a third representation of said third prediction error.

9. The method according to claim 1, further comprising defining a first pixel sub-block of multiple pixels and a second pixel sub-block of multiple pixels in said pixel block, wherein
determining said first minimum number of symbols comprises:
determining a first minimum number of symbols required for representing said first prediction errors calculated for each pixel in said first pixel sub-block except said defined starting pixel if said defined starting pixel is present in said first pixel sub-block; and
determining a first minimum number of symbols required for representing said first prediction errors calculated for each pixel in said second pixel sub-block except said defined starting pixel if said defined starting pixel is present in said second pixel sub-block;
determining said second minimum number of symbols comprises:
determining a second minimum number of symbols required for representing said second prediction errors calculated for each pixel in said first pixel sub-block except said defined starting pixel if said defined starting pixel is present in said first pixel sub-block; and
determining a second minimum number of symbols required for representing said second prediction errors calculated for each pixel in said second pixel sub-block except said defined starting pixel if said defined starting pixel is present in said second pixel sub-block, each symbol configuration of said set comprises a first symbol sub-configuration applicable to said first sub-block and a second sub-configuration applicable to said second sub-block; and
selecting said symbol configuration comprises selecting, among said set of multiple different symbol configurations, a symbol configuration based on said first minimum number of symbols and said second minimum number of symbols determined for said first pixel sub-block and based on said first minimum number of symbols and said second minimum number of symbols determined for said second pixel sub-block.

10. The method according to claim 1, further comprising transferring said compressed representation from said memory implemented in a graphical processing unit over a data bus to a buffer memory.

11. A compressing device for compressing a pixel block comprising multiple pixels each having a respective pixel value comprising at least a first pixel value component and a second pixel value component, said compressing device comprising:
a first error calculator configured to calculate, for each pixel of said multiple pixels except a defined starting pixel in said pixel block, a first prediction error based on a first pixel value component of said pixel and a first pixel value component of a respective prediction pixel;

a second error calculator configured to calculate, for each pixel of said multiple pixels except said defined starting pixel, a second prediction error based on said first pixel value component and a second pixel value component of said pixel and said first pixel value component and a second pixel value component of said respective prediction pixel;

a first minimum determiner configured to determine a first minimum number of symbols required for representing said first prediction errors calculated for each pixel of said multiple pixels except said defined starting pixel by said first error calculator;

a second minimum determiner configured to determine a second minimum number of symbols required for representing said second prediction errors calculated for each pixel of said multiple pixels except said defined starting pixel by said second error calculator; and a configuration selector configured to select, among a set of multiple different symbol configurations, a symbol configuration based on said first minimum number of symbols and said second minimum number of symbols, each symbol configuration of said set defines a respective first number of symbols maximally available for said first prediction errors and a respective second number of symbols maximally available for said second prediction errors, wherein a compressed representation of said pixel block comprises a configuration identifier of said symbol configuration selected by said configuration selector, a representation of a pixel value of said defined starting pixel and, for each pixel of said multiple pixels except said defined starting pixel, a first representation of said first prediction error and a second representation of said second prediction error, said first representations have maximally a same number of symbols as said first number of symbols of said selected symbol configuration and said second representations have maximally a same number of symbols as said second number of symbols of said selected symbol configuration.

12. The compressing device according to claim 11, wherein said first error calculator is configured to calculate, for each pixel of said multiple pixels except said defined starting pixel, said first prediction error based on said first pixel value component of said pixel and a first pixel value component of said defined starting pixel; and said second error calculator is configured to calculate, for each pixel of said multiple pixels except said defined starting pixel, said second prediction error based on said first pixel value component and said second pixel value component of said pixel and said first pixel value component and a second pixel value component of said defined starting pixel.

13. The compressing device according to claim 12, further comprising:

a maximum calculator configured to calculate, for each pixel of said multiple pixels except said defined starting pixel, a maximum value based on a sum of said second pixel value component of said defined starting pixel, said first prediction error calculated for said pixel by said first error calculator and a largest value representable by said second number of symbols available for said second prediction errors according to said symbol configuration selected by said configuration selector;

a minimum calculator configured to calculate, for each pixel of said multiple pixels except said defined starting pixel, a minimum value based on a sum of said second pixel value component of said defined starting pixel, said first prediction error calculated for said pixel by said first error calculator and a smallest value representable by said second number of symbols available for said second prediction errors according to said symbol configuration selected by said configuration selector; and a comparator configured to compare, for each pixel of said multiple pixels except said defined starting pixel, i) said maximum value with a maximum threshold and ii) said minimum value with a minimum threshold, wherein said second error value calculator is configured to i) recalculate, for each pixel of said multiple pixels for which said maximum value exceeds said maximum threshold as determined by said comparator, said second prediction error based on a difference between said second pixel value component of said pixel and a difference between said maximum threshold said largest value representable by said second number of symbols available for said second prediction errors according to said symbol configuration selected by said configuration selector, and ii) recalculate, for each pixel of said multiple pixels for which said minimum value is below said minimum threshold as determined by said comparator, said second prediction error based on a difference between said second pixel value component of said pixel and a difference between said minimum threshold and said smallest value representable by said second number of symbols available for said second prediction errors according to said symbol configuration selected by said configuration selector.

14. The compressing device according to claim 11, wherein said first error calculator is configured to calculate, for each pixel of said multiple pixels except said defined starting pixel, said first prediction error based on said first pixel value component of said pixel and a first pixel value component of a respective neighboring pixel in said pixel block; and said second error calculator is configured to calculate, for each pixel of said multiple pixels except said defined starting pixel, said second prediction error based on said first pixel value component and said second pixel value component of said pixel and said first pixel value component and a second pixel value component of said respective neighboring pixel.

15. The compressing device according to claim 11, further comprising a factor calculator configured to calculate a multiplication factor as a quotient between a difference between a second pixel value component of a first pixel in said pixel block and a second pixel value component of a second pixel in said pixel block and a difference between a first pixel value component of said first pixel and a first pixel value component of said second pixel, wherein said second error calculator is configured to calculate, for each pixel of said multiple pixels except said defined starting pixel, said second prediction error based on a difference between said second pixel value component of said pixel and said second pixel value component of said respective prediction pixel and said first prediction error multiplied by said multiplication factor.

16. The compressing device according to claim 11, further comprising a pixel selector configured to select one pixel of at least a subset of said multiple pixels in said pixel block as said defined starting pixel based on a pixel value of said one pixel, wherein said compressed representation comprises said configuration identifier, said representation of said pixel value of said defined starting pixel, a pixel identifier of said one pixel and, for each pixel of said multiple pixels except said defined starting pixel, said first representation of said first prediction error and said second representation of said second prediction error.

17. The compressing device according to claim 16, further comprising a value identifier configured to i) identify a largest pixel value of said at least a subset of said multiple pixels in said pixel block and ii) identify a smallest pixel value of said at least a subset of said multiple pixels in said pixel block, wherein said pixel selector is configured to select said one pixel as a pixel of said at least a subset of said multiple pixels in said pixel block having a pixel value that is closest to an average of said largest pixel value and said smallest pixel value.

18. The compressing device according to claim 11, wherein said respective pixel values comprise a red color component, a green color component and a blue color component,
   said first error calculator is configured to calculate, for each pixel of said multiple pixels except said defined starting pixel, i) a first candidate of said first prediction error based on a red color component of said pixel and a red color component of said respective prediction pixel and ii) a second candidate of said first prediction error based on a green color component of said pixel and a green color component of said respective prediction pixel,
   said second error calculator is configured to calculate, for each pixel of said multiple pixels except said defined starting pixel, i) a first candidate of said second prediction error based on a green color component of said pixel, a green color component of said respective prediction pixel and said first candidate of said first prediction error, ii) a second candidate of said second prediction error based on a red color component of said pixel, a red color component of said respective prediction pixel and said second candidate of said first prediction error, iii) a first candidate of a third prediction error based on a blue color component of said pixel, a blue color component of said respective prediction pixel and said first candidate of said first prediction error and iv) a second candidate of said third prediction error based on said blue component of said pixel, said blue component of said respective prediction pixel and said second candidate of said first prediction error,
   said compressing device further comprises a color component selector configured to select said first pixel value components as one of said red color components and said green color components and select said second pixel value components as the other of said red color components and said green color components based on said first candidates of said first prediction error, said first candidates of said second prediction error, said first candidates of said third prediction error, said second candidates of said first prediction error, said second candidates of said second prediction error and said second candidates of said third prediction error, wherein
   said second minimum determiner configured to determine a third minimum number of symbols required for representing said third prediction errors calculated for each pixel of said multiple pixels except said defined starting pixel; and
   said configuration selector configured to select, among said set of multiple different symbol configurations, said symbol configuration based on said first minimum number of symbols, said second minimum number of symbols and said third minimum number of symbols, wherein said compressed representation comprises said configuration identifier, said representation of said pixel value of said defined starting pixel, a color identifier defining whether said first pixel value components are red color components or green color components and, for each pixel of said multiple pixels except said defined starting pixel, said first representation of said first prediction error, said second representation of said second prediction error and a third representation of said third prediction error.

19. The compressing device according to claim 11, wherein said pixel block comprises a first pixel sub-block of multiple pixels and a second pixel sub-block of multiple pixels in said pixel block, wherein
   said first minimum determiner is configured to i) determine a first minimum number of symbols required for representing said first prediction errors calculated for each pixel in said first pixel sub-block except said defined starting pixel if said defined starting pixel is present in said first pixel sub-block, and ii) determine a first minimum number of symbols required for representing said first prediction errors calculated for each pixel in said second pixel sub-block except said defined starting pixel if said defined starting pixel is present in said second pixel sub-block;
   said second minimum determiner is configured to i) determine a second minimum number of symbols required for representing said second prediction errors calculated for each pixel in said first pixel sub-block except said defined starting pixel if said defined starting pixel is present in said first pixel sub-block, and ii) determine a second minimum number of symbols required for representing said second prediction errors calculated for each pixel in said second pixel sub-block except said defined starting pixel if said defined starting pixel is present in said second pixel sub-block, each symbol configuration of said set comprises a first symbol sub-configuration applicable to said first sub-block and a second sub-configuration applicable to said second sub-block, and
   said configuration selector is configured to select, among said set of multiple different symbol configurations, a symbol configuration based on said first minimum number of symbols and said second minimum number of symbols determined for said first pixel sub-block and based on said first minimum number of symbols and said second minimum number of symbols determined for said second pixel sub-block.

20. A graphical processing unit comprising said compressing device according to claim 11 and a memory configured to store said compressed representation.

21. The graphical processing unit according to claim 20, further comprising an output unit configured to transfer said compressed representation from said memory over a data bus to a buffer memory.

22. A media terminal comprising a graphical processing unit according to claim 20.

23. A method of decompressing a compressed representation of a pixel block comprising multiple pixels each having a respective pixel value comprising at least a first pixel value component and a second pixel value component, said method comprising:
   identifying, based on a configuration identifier comprised in said compressed representation and among a set of multiple different symbol configurations, a symbol configuration defining a first number of symbols maximally available for first prediction errors and a second number of symbols maximally available for second prediction errors;

determining a first pixel value component and a second pixel value component for a defined starting pixel in said pixel block based on a representation of said first pixel value component and said second pixel value component of said defined starting pixel comprised in said compressed representation;

retrieving, for each pixel of said multiple pixels except said defined starting pixel, a first representation of a first prediction error from said compressed representation based on said first number of symbols defined by said symbol configuration;

retrieving, for each pixel of said multiple pixels except said defined starting pixel, a second representation of a second prediction error from said compressed representation based on said second number of symbols defined by said symbol configuration;

calculating, for each pixel of said multiple pixels except said defined starting pixel, a first pixel value component of said pixel based on said first representation of said first prediction error of said pixel and a first pixel value component of a respective prediction pixel; and calculating, for each pixel of said multiple pixels except said defined starting pixel, a second pixel value component of said pixel based on said second representation of said second prediction error of said pixel, a second pixel value component of said respective prediction pixel and said first prediction error of said pixel.

24. A decompressing device for decompressing a compressed representation of a pixel block comprising multiple pixels each having a respective pixel value comprising at least a first pixel value component and a second pixel value component, said decompressing device comprising:

a configuration identifier configured to identify, based on a configuration identifier comprised in said compressed representation and among a set of multiple different symbol configurations, of a symbol configuration defining a first number of symbols maximally available for first prediction errors and a second number of symbols maximally available for second prediction errors;

a pixel determiner configured to determine a first pixel value component and a second pixel value component for a defined starting pixel in said pixel block based on a representation of said first pixel value component and said second pixel value component of said defined starting pixel comprised in said compressed representation;

a first error retriever configured to retrieve, for each pixel of said multiple pixels except said defined starting pixel, a first representation of a first prediction error from said compressed representation based on said first number of symbols defined by said symbol configuration;

a second error retriever configured to retrieve, for each pixel of said multiple pixels except said defined starting pixel, a second representation of a second prediction error from said compressed representation based on said second number of symbols defined by said symbol configuration;

a first value calculator configured to calculate, for each pixel of said multiple pixels except said defined starting pixel, a first pixel value component of said pixel based on said first representation of said first prediction error of said pixel and a first pixel value component of a respective prediction pixel; and a second value calculator configured to calculate, for each pixel of said multiple pixels except said defined starting pixel, a second pixel value component of said pixel based on said second representation of said second prediction error of said pixel, a second pixel value component of said respective prediction pixel and said first prediction error of said pixel.

25. A media terminal comprising a decompressing device according to claim 24 and a buffer memory configured to store said compressed representation.

* * * * *

UNITED STATES PATENT AND TRADEMARK OFFICE
CERTIFICATE OF CORRECTION

PATENT NO. : 8,737,750 B2  Page 1 of 1
APPLICATION NO. : 13/024077
DATED : May 27, 2014
INVENTOR(S) : Ström et al.

It is certified that error appears in the above-identified patent and that said Letters Patent is hereby corrected as shown below:

On the title page, item (75), under "Inventors", in Column 1, Line 1, delete "Strom," and insert -- Ström, --, therefor.

In the Specification

In Column 1, Line 37, delete "architecture," and insert -- architecture. --, therefor.

In Column 4, Line 30, delete "to ah" and insert -- to an --, therefor.

In Column 7, Line 50, delete "bits," and insert -- bits. --, therefor.

In Column 9, Line 36, delete "tupe" and insert -- tuple --, therefor.

In Column 19, Line 24, delete "terminal," and insert -- terminal. --, therefor.

In Column 25, Line 24, delete "i.e," and insert -- i.e. --, therefor.

In Column 25, Line 34, delete "words," and insert -- words. --, therefor.

In Column 27, Line 20, delete "C1-03" and insert -- C1-C3 --, therefor.

Signed and Sealed this
Thirty-first Day of March, 2015

Michelle K. Lee
*Director of the United States Patent and Trademark Office*